(12) United States Patent
Ren

(10) Patent No.: US 12,696,323 B2
(45) Date of Patent: Jul. 28, 2026

(54) RANDOM ACCESS METHOD, SATELLITE BASE STATION, GROUND TERMINAL AND STORAGE MEDIUM

(71) Applicant: DATANG MOBILE COMMUNICATIONS EQUIPMENT CO., LTD., Beijing (CN)

(72) Inventor: Bin Ren, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 322 days.

(21) Appl. No.: 18/704,459

(22) PCT Filed: Oct. 8, 2022

(86) PCT No.: PCT/CN2022/123795
§ 371 (c)(1),
(2) Date: Apr. 25, 2024

(87) PCT Pub. No.: WO2023/071721
PCT Pub. Date: May 4, 2023

(65) Prior Publication Data
US 2025/0240824 A1 Jul. 24, 2025

(30) Foreign Application Priority Data
Oct. 26, 2021 (CN) .......................... 202111245889.6

(51) Int. Cl.
*H04W 74/0833* (2024.01)
*G01S 19/14* (2010.01)
*H04W 72/1268* (2023.01)

(52) U.S. Cl.
CPC ......... *H04W 74/0833* (2013.01); *G01S 19/14* (2013.01); *H04W 72/1268* (2013.01)

(58) Field of Classification Search
CPC .......... H04W 72/1268; H04W 74/0833; G01S 19/14
(Continued)

(56) References Cited

U.S. PATENT DOCUMENTS

| | | | |
|---|---|---|---|
| 2022/0217790 A1* | 7/2022 | Qiu .................. | H04W 74/0833 |
| 2023/0034163 A1* | 2/2023 | Kim ..................... | H04W 76/30 |
| 2024/0064491 A1* | 2/2024 | Babaei ................... | H04W 4/06 |

FOREIGN PATENT DOCUMENTS

| | | |
|---|---|---|
| CN | 110913496 A | 3/2020 |
| CN | 112910541 A | 6/2021 |
(Continued)

OTHER PUBLICATIONS

CATT,"Discussion on Random Access Procedure for NTN", 3GPP TSG RAN WG2 Meeting #107bis, Chongqing, P.R. China, Oct. 14-18, 2019, total 8 pages, R2-1912159.
(Continued)

*Primary Examiner* — Peter G Solinsky
(74) *Attorney, Agent, or Firm* — KILPATRICK TOWNSEND & STOCKTON LLP

(57) ABSTRACT

Disclosed in the present disclosure are a random access method, a satellite base station, a ground terminal and a storage medium. The method includes: obtaining the beam type of a current beam and a random access process of the current beam from received system broadcast information of a satellite base station, and the beam type includes an access beam and a service beam; if the beam type of the current beam is an access beam, obtaining a position reporting mode of a ground terminal, and the position reporting mode is
(Continued)

A beam type of a current beam and a random access procedure of the current beam are obtained from a received system broadcast message from the satellite base station; wherein, the beam type includes an access beam and a service beam — 401

In case that the beam type of the current beam is an access beam, a location reporting mode of the terrestrial terminal is obtained; wherein, the location reporting mode is used for indicating a location reporting way of the terrestrial terminal — 402

In the random access procedure of the current beam, location information is reported by the location reporting mode, and the location information is used for determining the service beam corresponding to the terrestrial terminal — 403 configured for indicating a position reporting path of the ground terminal; and in the random access process of the current beam, reporting position information by utilizing the position reporting mode, the position information being used for determining a service beam corresponding to the ground terminal.

20 Claims, 12 Drawing Sheets

(58) Field of Classification Search
USPC ........................................................ 370/329
See application file for complete search history.

(56) References Cited

FOREIGN PATENT DOCUMENTS

| | | | |
|----|--------------|----|--------|
| CN | 113038618 | A | 6/2021 |
| JP | H09214414 | A | 8/1997 |
| WO | 2021022963 | A1 | 2/2021 |
| WO | 2021077422 | A1 | 4/2021 |
| WO | 2021146828 | A1 | 7/2021 |
| WO | 2021164686 | A1 | 8/2021 |

OTHER PUBLICATIONS

ZTE Corporation et al., "Location report in NTN", 3GPP TSG-RAN WG2 Meeting#107bis, Chongqing, China, Oct. 14-18, 2019, total 4 pages, R2-1912668.
Ericsson, "On Random Access in NTNs", 3GPP TSG-RAN WG2 #113bis_e,E-Meeting, Apr. 12, 2021-Apr. 20, 2021, total 13 pages, R2-2103951.
Xiaomi, "Discussion on UE location reporting in NTN", 3GPP TSG RAN WG2 #116, e-Meeting, Nov. 1-12, 2021, total 3 pages, R2-2111110.
Huawei, "How to report UE location", 3GPP TSG-RAN WG3 Meeting #104, Reno, Nevada, US, May 13-17, 2019, total 2 pages, R3-192731.
The extended European search report received in the counterpart European Application 22885603.5, mailed on Oct. 27, 2025.
The first office action and search report issued in Chinese counterpart application 202111245889.6, mailed on Mar. 29, 2025.
ZTE Corporation et al., "TP on Random Access for UE with location information", 3GPP TSG-RAN WG2 Meeting#107, Prague, Czech, Aug. 26-30, 2019, total 16 pages, R2-1911768.
The office action issued in Japan counterpart application 2024-525477, mailed on Jan. 21, 2025.

* cited by examiner

Satellite
base station

Service
beam

Coverage of an
access beam

Coverage of a
satellite base station

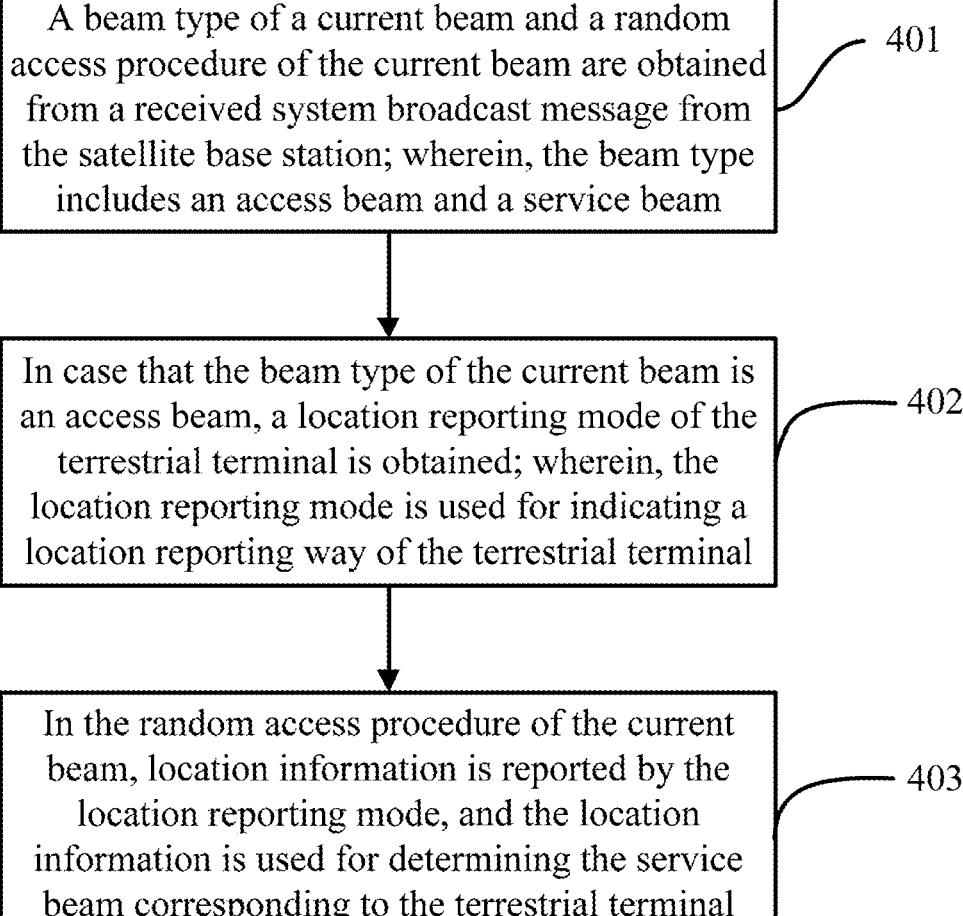

A beam type of a current beam and a random access procedure of the current beam are obtained from a received system broadcast message from the satellite base station; wherein, the beam type includes an access beam and a service beam — 401

In case that the beam type of the current beam is an access beam, a location reporting mode of the terrestrial terminal is obtained; wherein, the location reporting mode is used for indicating a location reporting way of the terrestrial terminal — 402

In the random access procedure of the current beam, location information is reported by the location reporting mode, and the location information is used for determining the service beam corresponding to the terrestrial terminal — 403

FIG. 4

Coverage of an
access beam

Sub-range of an
access beam

Coverage of a
service beam

Coverage of a
service beam

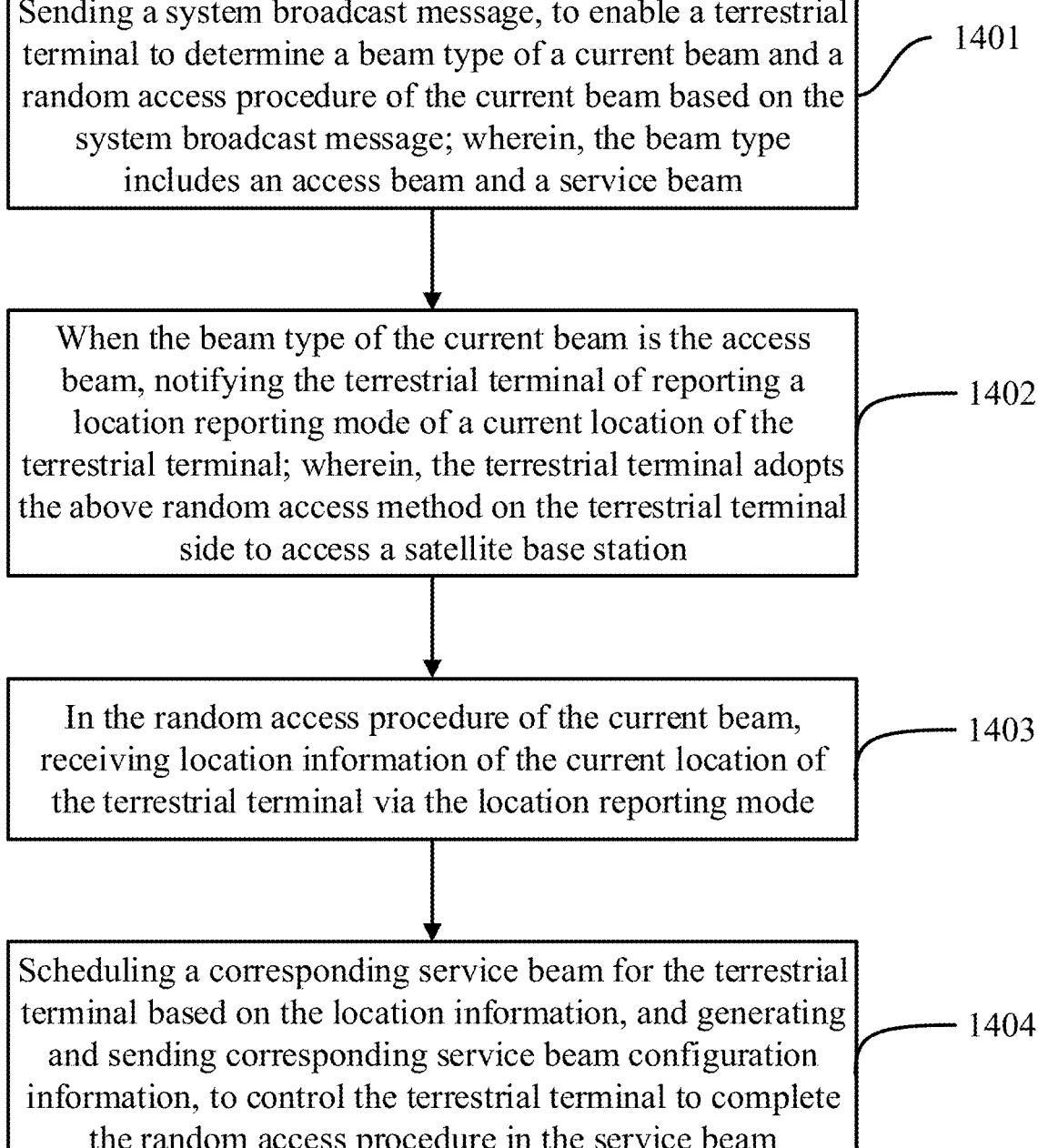

Sending a system broadcast message, to enable a terrestrial terminal to determine a beam type of a current beam and a random access procedure of the current beam based on the system broadcast message; wherein, the beam type includes an access beam and a service beam — 1401

When the beam type of the current beam is the access beam, notifying the terrestrial terminal of reporting a location reporting mode of a current location of the terrestrial terminal; wherein, the terrestrial terminal adopts the above random access method on the terrestrial terminal side to access a satellite base station — 1402

In the random access procedure of the current beam, receiving location information of the current location of the terrestrial terminal via the location reporting mode — 1403

Scheduling a corresponding service beam for the terrestrial terminal based on the location information, and generating and sending corresponding service beam configuration information, to control the terrestrial terminal to complete the random access procedure in the service beam — 1404

FIG. 14

RANDOM ACCESS METHOD, SATELLITE BASE STATION, GROUND TERMINAL AND STORAGE MEDIUM

CROSS-REFERENCE TO RELATED APPLICATIONS

The application is a National Stage of International Application No. PCT/CN2022/123795 filed Oct. 8, 2022, which claims the priority of the Chinese patent application No. 202111245889.6 filed to the China National Intellectual Property Administration on Oct. 26, 2021 and entitled "RANDOM ACCESS METHOD, SATELLITE BASE STATION, GROUND TERMINAL AND STORAGE MEDIUM", of which the entire content is incorporated herein by reference.

FIELD

The present disclosure relates to the field of satellite communication, and in particular, relates to a random access method, a satellite base station, a terrestrial terminal and a storage medium.

BACKGROUND

In the satellite communication system (non-terrestrial networks, NTN), in order to improve the efficiency of the beam application, an access beam often has a larger coverage, and a service beam (also called the data service beam) that actually provides services has a smaller coverage.

For example, a typical satellite communication system includes two types of beams: an access beam and a service beam. Here, the access beam is configured for scheduling the service beam. Due to the large coverage of a single beam of the satellite, it is difficult for the satellite network to perform beam tracking and scheduling when the location of the NTN terrestrial terminal cannot be obtained. Under the condition that the coverage area of the initial access beam is large, but the actual coverage area of the service beam is small, when the network needs to schedule service beams to serve users, and the satellite does not obtain the location information of the NTN terrestrial terminal, the satellite cannot accurately schedule the service beams suitable for the NTN terrestrial terminal for subsequent uplink and downlink data transmission.

In the existing satellite communication system, how to report the location information of the NTN terrestrial terminal has not yet been stipulated. The potential location information reporting modes of the NTN terrestrial terminal may include a global navigation satellite system (GNSS) location information reporting mode, a cell identification reporting mode and a beam identification reporting mode. But in case that the coverage of the access beam is large and the coverage of the service beam is small, the above potential location information reporting modes cannot guarantee the accuracy and reliability of the location of the NTN terrestrial terminal, resulting in the inability of the NTN terrestrial terminal to accurately access the appropriate service beam, which ultimately leads to the failure of access to the satellite communication system.

In view of this, how to allow NTN terrestrial terminals to accurately access appropriate service beams has become an urgent problem to be solved.

SUMMARY

The present disclosure provides a random access method, a satellite base station, a terrestrial terminal and a storage medium, to solve the above problem existing in the related art.

In one embodiment, in order to solve the above problem, a random access method according to an embodiment of the present disclosure is performed by a terrestrial terminal in a satellite communication system, and the embodiments of the method is as follows:

obtaining a beam type of a current beam and a random access procedure of the current beam from a received system broadcast message from a satellite base station; and the beam type includes an access beam and a service beam;

obtaining a location reporting mode of the terrestrial terminal in case that the beam type of the current beam is the access beam; and the location reporting mode is configured for indicating a location reporting way of the terrestrial terminal; and reporting location information by the location reporting mode in the random access procedure of the current beam; and the location information is configured for determining the service beam corresponding to the terrestrial terminal.

In a possible implementation manner, the method further includes:

obtaining beam configuration information of the current beam; and, in case that the beam type of the current beam is the access beam, the beam configuration information includes sub-ranges included in a coverage of the current beam, one or more sub-ranges of the current beam corresponds to one service beam in the current beam, and different service beams correspond to different sub-ranges;

in case that the terrestrial terminal does not have a global navigation satellite system (GNSS) positioning function, determining positioning information of a current location of the terrestrial terminal by using other positioning methods except the GNSS positioning function; and taking a service beam index of the service beam in the beam configuration information that corresponds to an index value of the sub-range corresponding to the positioning information, as the location information of the terrestrial terminal; and in case that the terrestrial terminal has the GNSS positioning function, obtaining GNSS positioning information of the current location of the terrestrial terminal based on the GNSS positioning function; and taking a service beam index in the beam configuration information that corresponds to the GNSS positioning information, as the location information of the terrestrial terminal.

In a possible implementation manner, the obtaining of the location reporting mode of the terrestrial terminal includes:

receiving first information of the satellite base station;

in case that the first information includes a signaling directly indicating the location reporting mode, determining the location reporting mode based on the signaling; and in case that the first information is random access channel (RACH) configuration information of the current beam, determining the location reporting mode based on whether a RACH configuration parameter associated with the location information exists in the RACH configuration information.

In a possible implementation manner, the location reporting mode includes: location reporting via at least one of a message transmitted by a random access preamble, or an uplink scheduling message carried by a physical uplink shared channel (PUSCH).

In a possible implementation manner, in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure.

In a possible implementation manner, the signaling includes: a master information block (MIB) or a system information block 1 (SIB1).

In a possible implementation manner, the determining of the location reporting mode based on whether the RACH configuration parameter associated with the location information exists in the RACH configuration information, includes:

in case that there is the RACH configuration parameter in the RACH configuration information associated with the location information, reporting the location information in the message transmitted by the random access preamble corresponding to the current beam; and in case that there is no RACH configuration parameter in the RACH configuration information associated with the location information, reporting the location information in the uplink scheduling message corresponding to the current beam.

In a possible implementation manner, the reporting of the location information by the location reporting mode includes:

in case that the location reporting mode is transmission in the message transmitted by the random access preamble, reporting the location information via the message transmitted by a corresponding random access preamble, in the random access procedure adopted by the current beam;

in case that the location reporting mode is transmission in the uplink scheduling message, reporting the location information via a corresponding uplink scheduling message, in the random access procedure adopted by the current beam;

in case that the location reporting mode is respective transmission in the message transmitted by the random access preamble and the uplink scheduling message, reporting the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, dividing the location information into two parts, and reporting the parts of the location information via the message transmitted by a corresponding random access preamble and uplink scheduling message respectively, in the random access procedure adopted by the current beam.

In a possible implementation manner, the reporting of the location information via the message transmitted by the corresponding random access preamble includes:

determining a current value of the RACH configuration parameter corresponding to the location information based on a corresponding relationship between bits or values occupied by the location information and values of the RACH configuration parameter; and reporting the current value in the message transmitted by the corresponding random access preamble, in the random access procedure adopted by the current beam.

In a possible implementation manner, the RACH configuration parameter includes: at least one of a PRACH format, a RACH occasion (RO) resource, or a preamble index resource of the preamble.

In a possible implementation manner, the preamble index resource includes: a one-level preamble index and a multi-level preamble index; and, the multi-level preamble index includes multiple one-level preamble indexes; each level of preamble indexes corresponds to one preamble index range; and adjacent two levels of preamble indexes have same or different preamble index ranges, and take values independent of each other.

In a possible implementation manner, a total number of bits occupied by the location information is $\log 2(R)$; and, R is a size of a value range of the RACH configuration parameter, and $\log 2( )$ indicates a logarithm with a base of 2.

In a possible implementation manner, in case that the location information is indicated by the multi-level preamble index: bits corresponding to the total number of bits or all values of the location information are divided into multiple sets according to a preset order, the multiple sets are in one-to-one correspondence with the multi-level preamble index, and bits or values of the location information in each of the multiple sets are in one-to-one correspondence with preamble indexes in a corresponding level of preamble indexes.

In a possible implementation manner, the preset order includes: an order of the location information from a high bit to a low bit, or an order of the location information from a low bit to a high bit.

In a possible implementation manner, in case that the location information is jointly indicated by the RO resource and the preamble index resource, one RO carries the one-level preamble index.

In a possible implementation manner, the reporting of the location information via the corresponding uplink scheduling message includes: reporting the location information via at least one of data part of the PUSCH carrying the uplink scheduling message or a PUSCH demodulation reference signal (DMRS), or reporting the location information jointly via data part of the PUSCH carrying the uplink scheduling message and a PUSCH DMRS.

In a possible implementation manner, in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; and, the preset order includes an order of the location information from a high bit to a low bit, or an order of the location information from a low bit to a high bit.

In another embodiment, an embodiment of the present disclosure provides a random access method, which is performed by a satellite base station in a satellite communication system, and the method includes:

sending a system broadcast message, to enable a terrestrial terminal to determine a beam type of a current beam and a random access procedure of the current beam based on the system broadcast message; and the beam type includes an access beam and a service beam;

notifying the terrestrial terminal of reporting a location reporting mode of a current location of the terrestrial terminal in case that the beam type of the current beam is the access beam; and, the terrestrial terminal adopts the random access method in one embodiment to randomly access the satellite base station;

receiving location information of the current location of the terrestrial terminal via the location reporting mode, in the random access procedure of the current beam; and scheduling a corresponding service beam for the terrestrial terminal based on the location information, and generating and sending corresponding service beam configuration information, to control the terrestrial terminal to complete the random access procedure in the service beam.

In yet another embodiment of the present disclosure also provides a terrestrial terminal, including a memory, a transceiver, and a processor. The memory is configured to store computer programs; the transceiver is configured to send and receive data under the control of the processor; and the processor is configured to read the computer programs in the memory and perform:

obtaining a beam type of a current beam and a random access procedure of the current beam from a received system broadcast message from a satellite base station; and the beam type includes an access beam and a service beam;

obtaining a location reporting mode of the terrestrial terminal in case that the beam type of the current beam is the access beam; and the location reporting mode is configured for indicating a location reporting way of the terrestrial terminal; and reporting location information by the location reporting mode in the random access procedure of the current beam; and the location information is configured for determining the service beam corresponding to the terrestrial terminal.

In a possible implementation manner, the processor is further configured to:

obtain beam configuration information of the current beam; and, in case that the beam type of the current beam is the access beam, the beam configuration information includes sub-ranges included in a coverage of the current beam, one or more sub-ranges of the current beam corresponds to one service beam in the current beam, and different service beams correspond to different sub-ranges;

in case that the terrestrial terminal does not have a global navigation satellite system (GNSS) positioning function, determine positioning information of a current location of the terrestrial terminal by using other positioning methods except the GNSS positioning function; and take a service beam index of the service beam in the beam configuration information that corresponds to an index value of the sub-range corresponding to the positioning information, as the location information of the terrestrial terminal; and in case that the terrestrial terminal has the GNSS positioning function, obtain GNSS positioning information of the current location of the terrestrial terminal based on the GNSS positioning function; and take a service beam index in the beam configuration information that corresponds to the GNSS positioning information, as the location information of the terrestrial terminal.

In a possible implementation manner, the processor is further configured to:

receive first information of the satellite base station;

in case that the first information includes a signaling directly indicating the location reporting mode, determine the location reporting mode based on the signaling; and in case that the first information is random access channel (RACH) configuration information of the current beam, determine the location reporting mode based on whether a RACH configuration parameter associated with the location information exists in the RACH configuration information.

In a possible implementation manner, the location reporting mode includes: location reporting via at least one of a message transmitted by a random access preamble, or an uplink scheduling message carried by a PUSCH.

In a possible implementation manner, in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure.

In a possible implementation manner, the signaling includes: a MIB or a SIB1.

In a possible implementation manner, the processor is further configured to:

in case that there is the RACH configuration parameter in the RACH configuration information associated with the location information, report the location information in the message transmitted by the random access preamble corresponding to the current beam; and in case that there is no RACH configuration parameter in the RACH configuration information associated with the location information, report the location information in the uplink scheduling message corresponding to the current beam.

In a possible implementation manner, the processor is further configured to:

in case that the location reporting mode is transmission in the message transmitted by the random access preamble, report the location information via the message transmitted by a corresponding random access preamble, in the random access procedure adopted by the current beam;

in case that the location reporting mode is transmission in the uplink scheduling message, report the location information via a corresponding uplink scheduling message, in the random access procedure adopted by the current beam;

in case that the location reporting mode is respective transmission in the message transmitted by the random access preamble and the uplink scheduling message, report the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, divide the location information into two parts, and report the parts of the location information via the message transmitted by a corresponding random access preamble and uplink scheduling message respectively, in the random access procedure adopted by the current beam.

In a possible implementation manner, the processor is further configured to:

determine a current value of the RACH configuration parameter corresponding to the location information based on a corresponding relationship between bits or values occupied by the location information and values of the RACH configuration parameter; and report the current value in the message transmitted by the corresponding random access preamble, in the random access procedure adopted by the current beam.

In a possible implementation manner, the RACH configuration parameter includes: at least one of a PRACH format, a RO resource, or a preamble index resource of the preamble.

In a possible implementation manner, the preamble index resource includes: a one-level preamble index and a multi-level preamble index; and, the multi-level preamble index includes multiple one-level preamble indexes; each level of preamble indexes corresponds to one preamble index range; and adjacent two levels of preamble indexes have same or different preamble index ranges, and take values independent of each other.

In a possible implementation manner, a total number of bits occupied by the location information is log 2(R); and, R is a size of a value range of the RACH configuration parameter, and log 2( ) indicates a logarithm with a base of 2.

In a possible implementation manner, in case that the location information is indicated by the multi-level preamble index: bits corresponding to the total number of bits or all values of the location information are divided into multiple sets according to a preset order, the multiple sets are in one-to-one correspondence with the multi-level preamble index, and bits or values of the location information in each of the multiple sets are in one-to-one correspondence with preamble indexes in a corresponding level of preamble indexes.

In a possible implementation manner, the preset order includes: an order of the location information from a high bit to a low bit, or an order of the location information from a low bit to a high bit.

In a possible implementation manner, in case that the location information is jointly indicated by the RO resource and the preamble index resource, one RO carries the one-level preamble index.

In a possible implementation manner, the processor is further configured to: report the location information via at least one of data part of the PUSCH carrying the uplink scheduling message or a PUSCH DMRS, or report the location information jointly via data part of the PUSCH carrying the uplink scheduling message and a PUSCH DMRS.

In a possible implementation manner, in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; and, the preset order includes an order of the location information from a high bit to a low bit, or an order of the location information from a low bit to a high bit.

In one embodiment of the present disclosure provides a satellite base station, including a memory, a transceiver, and a processor. The memory is configured to store computer programs; the transceiver is configured to send and receive data under the control of the processor; and the processor is configured to read the computer programs in the memory and perform:

sending a system broadcast message, to enable a terrestrial terminal to determine a beam type of a current beam and a random access procedure of the current beam based on the system broadcast message; and the beam type includes an access beam and a service beam;

notifying the terrestrial terminal of reporting a location reporting mode of a current location of the terrestrial terminal in case that the beam type of the current beam is the access beam; and, the terrestrial terminal adopts the random access method on the terrestrial terminal side to access the satellite base station;

receiving location information of the current location of the terrestrial terminal via the location reporting mode, in the random access procedure of the current beam; and scheduling a corresponding service beam for the terrestrial terminal based on the location information, and generating and sending corresponding service beam configuration information, to control the terrestrial terminal to complete the random access procedure in the service beam.

In another embodiment of the present disclosure also provides a terrestrial terminal, including:

a receiving unit, configured to obtain a beam type of a current beam and a random access procedure of the current beam from a received system broadcast message from a satellite base station; and the beam type includes an access beam and a service beam;

the receiving unit further configured to: obtain a location reporting mode of the terrestrial terminal in case that the beam type of the current beam is the access beam; and the location reporting mode is configured for indicating a location reporting way of the terrestrial terminal; and a sending unit, configured to report location information by the location reporting mode in the random access procedure of the current beam; and the location information is configured for determining the service beam corresponding to the terrestrial terminal.

In a possible implementation manner, the receiving unit is further configured to:

obtain beam configuration information of the current beam; and, in case that the beam type of the current beam is the access beam, the beam configuration information includes sub-ranges included in a coverage of the current beam, one or more sub-ranges of the current beam corresponds to one service beam in the current beam, and different service beams correspond to different sub-ranges;

in case that the terrestrial terminal does not have a global navigation satellite system (GNSS) positioning function, determine positioning information of a current location of the terrestrial terminal by using other positioning methods except the GNSS positioning function; and take a service beam index of the service beam in the beam configuration information that corresponds to an index value of the sub-range corresponding to the positioning information, as the location information of the terrestrial terminal; and in case that the terrestrial terminal has a GNSS positioning function, obtain GNSS positioning information of a current location of the terrestrial terminal based on the GNSS positioning function; and take a service beam index in the beam configuration information that corresponds to the GNSS positioning information, as the location information of the terrestrial terminal.

In a possible implementation manner, the receiving unit is further configured to:

receive first information of the satellite base station;

in case that the first information includes a signaling directly indicating the location reporting mode, determine the location reporting mode based on the signaling; and in case that the first information is random access channel (RACH) configuration information of the current beam, determine the location reporting mode based on whether a RACH configuration parameter associated with the location information exists in the RACH configuration information.

In a possible implementation manner, the location reporting mode includes: location reporting via at least one of a message transmitted by a random access preamble, or an uplink scheduling message carried by a PUSCH.

In a possible implementation manner, in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure.

In a possible implementation manner, the signaling includes: a MIB or a SIB1.

In a possible implementation manner, the determining of the location reporting mode based on whether the RACH configuration parameter associated with the location information exists in the RACH configuration information includes:

in case that there is a RACH configuration parameter in the RACH configuration information associated with the location information, reporting the location information in the message transmitted by the random access preamble corresponding to the current beam; and in case that there is no RACH configuration parameter in the RACH configuration information associated with the location information, reporting the location information in the uplink scheduling message corresponding to the current beam.

In a possible implementation manner, the sending unit is further configured to:

in case that the location reporting mode is transmission in the message transmitted by the random access preamble, report the location information via the message transmitted by a corresponding random access preamble, in the random access procedure adopted by the current beam;

in case that the location reporting mode is transmission in the uplink scheduling message, report the location information via a corresponding uplink scheduling message in the random access procedure adopted by the current beam;

in case that the location reporting mode is respective transmission in the message transmitted by the random access preamble and the uplink scheduling message, report the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, divide the location information into two parts, and report the parts of the location information via the message transmitted by a corresponding random access preamble and uplink scheduling message respectively, in the random access procedure adopted by the current beam.

In a possible implementation manner, the sending unit is further configured to:

determine a current value of the RACH configuration parameter corresponding to the location information based on a corresponding relationship between bits or values occupied by the location information and values of the RACH configuration parameter; and report the current value in the message transmitted by the corresponding random access preamble, in the random access procedure adopted by the current beam.

In a possible implementation manner, the RACH configuration parameter includes: at least one of a PRACH format, a RO resource, or a preamble index resource of the preamble.

In a possible implementation manner, the preamble index resource includes: a one-level preamble index and a multi-level preamble index; and, the multi-level preamble index includes multiple one-level preamble indexes; each level of preamble indexes corresponds to one preamble index range; and adjacent two levels of preamble indexes have same or different preamble index ranges, and take values independent of each other.

In a possible implementation manner, a total number of bits occupied by the location information is log 2(R); and, R is a size of a value range of the RACH configuration parameter, and log 2( ) indicates a logarithm with a base of 2.

In a possible implementation manner, in case that the location information is indicated by the multi-level preamble index: bits corresponding to the total number of bits or all values of the location information are divided into multiple sets in a preset order, the multiple sets are in one-to-one correspondence with the multi-level preamble index, and bits or values of the location information in each of the multiple sets are in one-to-one correspondence with preamble indexes in a corresponding level of preamble indexes.

In a possible implementation manner, the preset order includes: an order of the location information from a high bit to a low bit, or an order of the location information from a low bit to a high bit.

In a possible implementation manner, in case that the location information is jointly indicated by the RO resource and the preamble index resource, one RO carries the one-level preamble index.

In a possible implementation manner, the sending unit is further configured to: report the location information via at least one of data part of the PUSCH carrying the uplink scheduling message or a PUSCH DMRS, or report the location information jointly via data part of the PUSCH carrying the uplink scheduling message and a PUSCH DMRS.

In a possible implementation manner, in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; and, the preset order includes an order of the location information from a high bit to a low bit, or an order of the location information from a low bit to a high bit.

In yet another embodiment of the present disclosure provides a satellite base station, including:

a sending unit, configured to send a system broadcast message, to enable a terrestrial terminal to determine a beam type of a current beam and a random access procedure of the current beam based on the system broadcast message; and the beam type includes an access beam and a service beam;

the sending unit further configured to: notify the terrestrial terminal of reporting a location reporting mode of a current location of the terrestrial terminal in case that the beam type of the current beam is the access beam; and, the terrestrial terminal adopts the random access method on the terrestrial terminal side to access the satellite base station; and a receiving unit, configured to receive location information of the current location of the terrestrial terminal via the location reporting mode, in the random access procedure of the current beam; and the sending unit further configured to: schedule a corresponding service beam for the terrestrial terminal based on the location information, and generate and send corresponding service beam configuration information, to control the terrestrial terminal to complete the random access procedure in the service beam.

In one embodiment of the present disclosure further provide a processor-readable storage medium, storing computer programs; and the computer programs are configured to cause the processor to execute the method according to the embodiments.

Through the above one or more embodiments of the embodiments of the present disclosure, the embodiments of the present disclosure have at least the following effects:

in the embodiments according to the present disclosure, when the current beam received by the terrestrial terminal is an access beam, in the random access procedure of the access beam, the location information of the terrestrial terminal is reported to the satellite base station according to the location reporting mode specified by the satellite base station, which make the satellite base station quickly and accurately obtain the location information of the terrestrial terminal, and then allocate suitable service beams for the terrestrial terminal according to the location information of the terrestrial terminal, and the terrestrial terminal can accurately access the appropriate service beam, and then successfully access the satellite communication system.

BRIEF DESCRIPTION OF FIGURES

FIG. 4 is a flowchart of a random access method on the terrestrial terminal side according to an embodiment of the present disclosure.

FIG. 14 is a flowchart of a random access method on the satellite base station side according to an embodiment of the present disclosure.

DETAILED DESCRIPTION

The term "and/or" in the embodiments of the present disclosure describes the association relationship of associated objects, indicating that there may be three types of relationships, for example, A and/or B can represent three cases of A alone, A and B together, and B alone. The symbol "/" generally indicates that the associated objects are in an "or" relationship.

The term "plurality" in the embodiments of the present disclosure refers to two or more, and other quantifiers are similar.

The following will clearly and completely describe the embodiments of the present disclosure with reference to the accompanying drawings in the embodiments of the present disclosure. The described embodiments are only some embodiments of the present disclosure, not all of them.

The embodiments of the present disclosure can be applicable to various systems, especially a 5G system. For example, the applicable systems may be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, an universal mobile telecommunications system (UMTS), a worldwide interoperability for microwave access (WiMAX) system, a 5G new radio (NR) system, etc. These various systems include terminal devices and network devices. The system may also include a core network part, such as an evolved packet system (EPS), a 5G system (5GS), and the like.

The terrestrial terminal involved in the embodiments of the present disclosure is a device with wireless transceiver function, which can be deployed on land, including indoor or outdoor, handheld, wearable or vehicle-mounted; the terrestrial terminal can also be deployed on water, such as on a ship, etc.; and the terrestrial terminal can also be deployed in the air, such as on an aircraft, balloon or satellite, etc. The terrestrial terminal can be a mobile phone is configured to communicate with a satellite base station, a tablet computer (Pad), a computer with the wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation safety, a wireless terminal in the smart city, or a wireless terminal in the smart home, etc.

The satellite base station involved in the embodiments of the present disclosure can provide wireless access services for terrestrial terminals, schedule wireless resources for accessed terrestrial terminals, and provide reliable wireless transmission protocols and data encryption protocols, etc.

Figure 1:
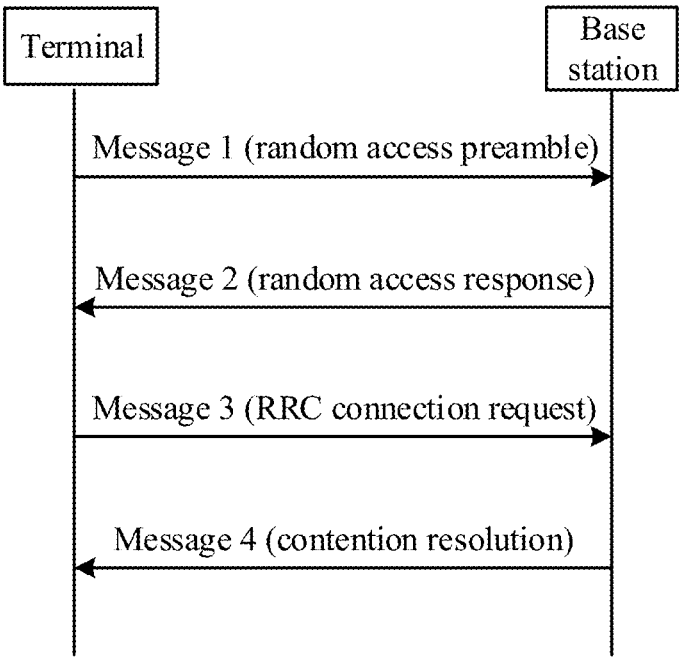
FIG. 1 is a diagram of a four-step random access procedure in a 5G NR system.

Please refer to FIG. 1, which is a diagram of a four-step random access procedure in the 5G NR system.

Step 101: the terminal sends a message 1 (random access preamble) to the base station.

In step 101, the terminal sends a random access preamble which can also be called as message 1 (Msg1) to the base station on a physical random access channel (PRACH) time-frequency resource. The function of the random access preamble is to notify the base station that there is a random access request, and enable the base station to estimate the transmission delay between the base station and the terminal, and the base station can calibrate uplink timing and inform the terminal of the calibrated information through a timing advance (TA) command.

Step 102: the base station sends a message 2 (random access response) to the terminal.

After detecting the random access preamble, the base station sends a random access response (RAR), which can also be called as a message 2 (Msg2), on a physical downlink control channel (PDCCH)/physical downlink shared channel (PDSCH). The random access response may include the sequence number of the random access preamble received in the above step 101, the TA command, uplink resource allocation information, and a cell-radio network temporary identifier (C-RNTI), etc.

Step 103: the terminal sends a message 3 (RRC connection request) to the base station.

After the terminal receives the random access response, if the random access preamble indicated by the sequence number of the random access preamble in the random access response is the same as the random access preamble sent by the terminal to the base station in the above step 101, the terminal considers that this random access response is a random access response for the terminal. Afterwards, the terminal sends an uplink message (RRC connection request), also called as a message 3 (Msg3), on the uplink resource indicated by the random access response, herein, Msg3 may carry a unique user identifier.

Step 104: the base station sends a message 4 (contention resolution) to the terminal.

The base station receives uplink data of the terminal, and returns a contention resolution message, also called as the message 4 (Msg4), to the successfully accessed terminal on the PDSCH. The unique user identifier in the Msg3 will be carried in the conflict resolution message by the base station to indicate the terminal that has successfully accessed, while other terminals that have not successfully accessed will re-initiate the random access.

Figure 2:
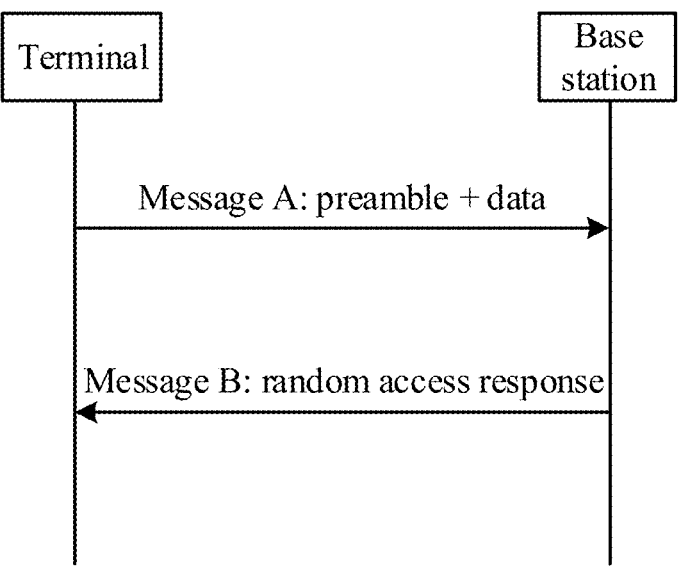
FIG. 2 is a diagram of a two-step random access procedure in a 5G NR system.

In order to reduce the access delay and signaling overhead, a two-step random access procedure is also proposed in the 5G NR system. Please refer to FIG. 2, which is a diagram of a two-step random access procedure in the 5G NR system.

Step 201: the terminal sends a message A (preamble+data) to the base station.

The message A (MsgA) includes a preamble part of the MsgA and a data part of the MsgA. The preamble is carried on the MsgA PRACH for transmission, and the data part is carried on the MsgA PUSCH for transmission. The above data part may include, for example, a terminal identifier, a scheduling request (SR), and small data packets, etc.

Step 202: the base station sends a message B (random access response) to the terminal.

The base station sends a random access response to the terminal, which can also be called as a message B (MsgB). The above random access response includes: a random access preamble ID (RAPID), a TA command, and a C-RNTI, etc.

Figure 3:
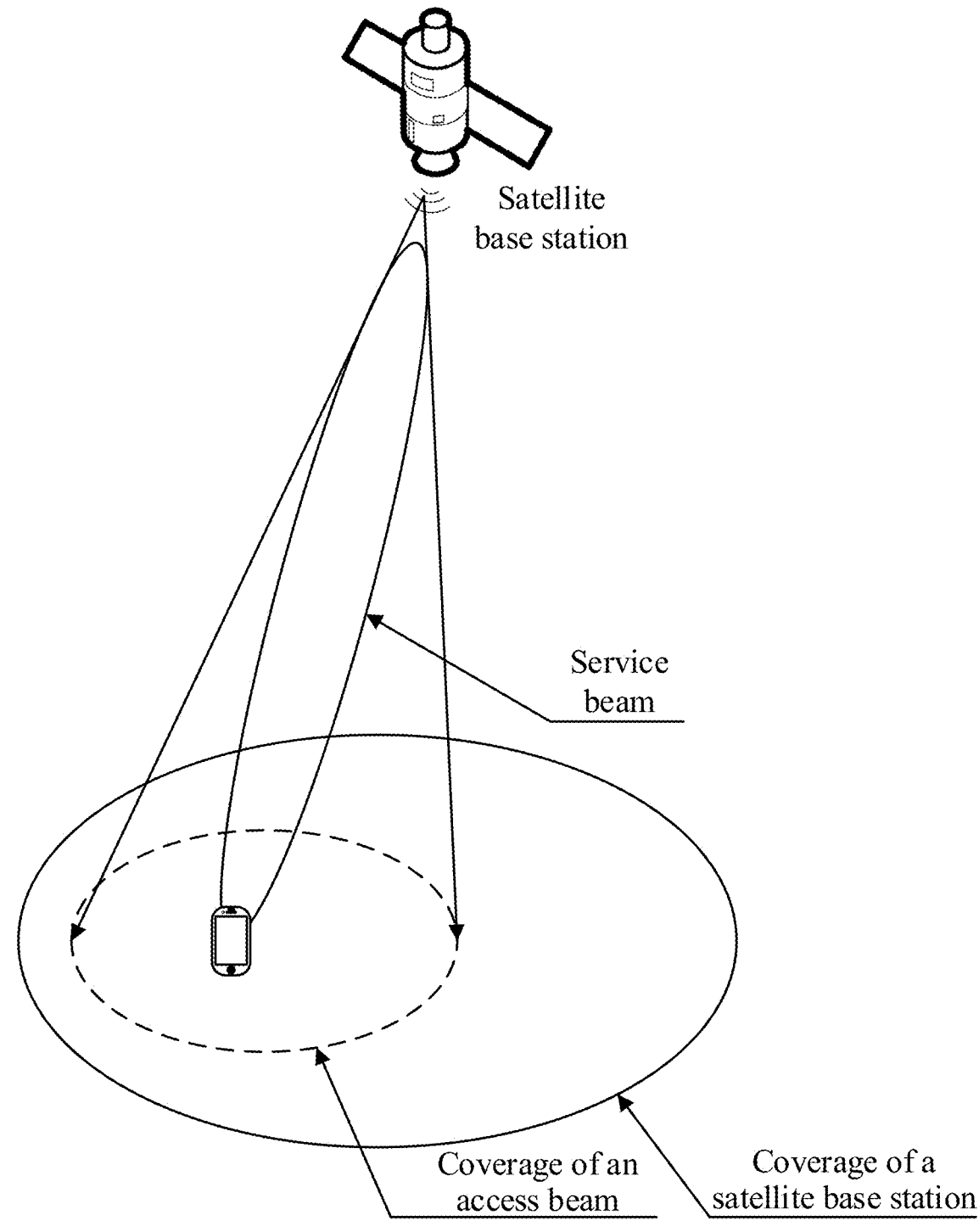
FIG. 3 is a schematic diagram of beam coverage of a satellite.

Please refer to FIG. 3 which is a schematic diagram of beam coverage of a satellite. In FIG. 3, the largest ellipse is the entire coverage of the satellite base station, and the dotted ellipse is the coverage of an access beam of the satellite base station. The service beam (also called a data beam) shown in FIG. 3 is a small beam aimed at the terrestrial terminal, to realize the beam focusing function, and perform data transmission with the terrestrial terminal. Since the coverage of the access beam is larger than that of the service beam, if during the initial access process, such as Msg3, the terrestrial terminal needs to be transferred to the service beam to work, the network side will not be able to schedule and configure the service beam due to the lack of the user's location information, making it impossible for the terrestrial terminal to accurately access an appropriate service beam and further to successfully access the satellite communication system.

In order to solve the above problem, the embodiments of the present disclosure provide a random access method, a satellite base station, a terrestrial terminal, and a storage medium.

Please refer to FIG. 4, the embodiment of the present disclosure provides a random access method, which is performed by a terrestrial terminal in a satellite communication system. The processing process of the method is as follows.

Step 401: a beam type of a current beam and a random access procedure of the current beam are obtained from a received system broadcast message from the satellite base station; and, the beam type includes an access beam and a service beam.

The above random access procedure may be the aforementioned four-step random access procedure, or the two-step random access procedure, which is specifically determined by the network side. The beam type of the current beam and the random access procedure adopted are carried in a system broadcast message of the satellite base station. The terrestrial terminal can obtain the above-mentioned information through the obtained system broadcast message.

After the terrestrial terminal obtains the beam type to which the current beam belongs and the random access procedure adopted, the step 402 can be performed.

Step 402: in case that the beam type of the current beam is an access beam, a location reporting mode of the terrestrial terminal is obtained; and, the location reporting mode is configured for indicating a location reporting way of the terrestrial terminal.

After or before obtaining the location reporting mode of the terrestrial terminal, the terrestrial terminal also needs to obtain its location information, which can be achieved in the following way:

the beam configuration information of the current beam is obtained; and, when the beam type of the current beam is the access beam, the beam configuration information includes sub-ranges included in a coverage of the current beam, one or more sub-ranges of the current beam corresponds to one service beam in the current beam, and different service beams correspond to different sub-ranges.

Figure 5:
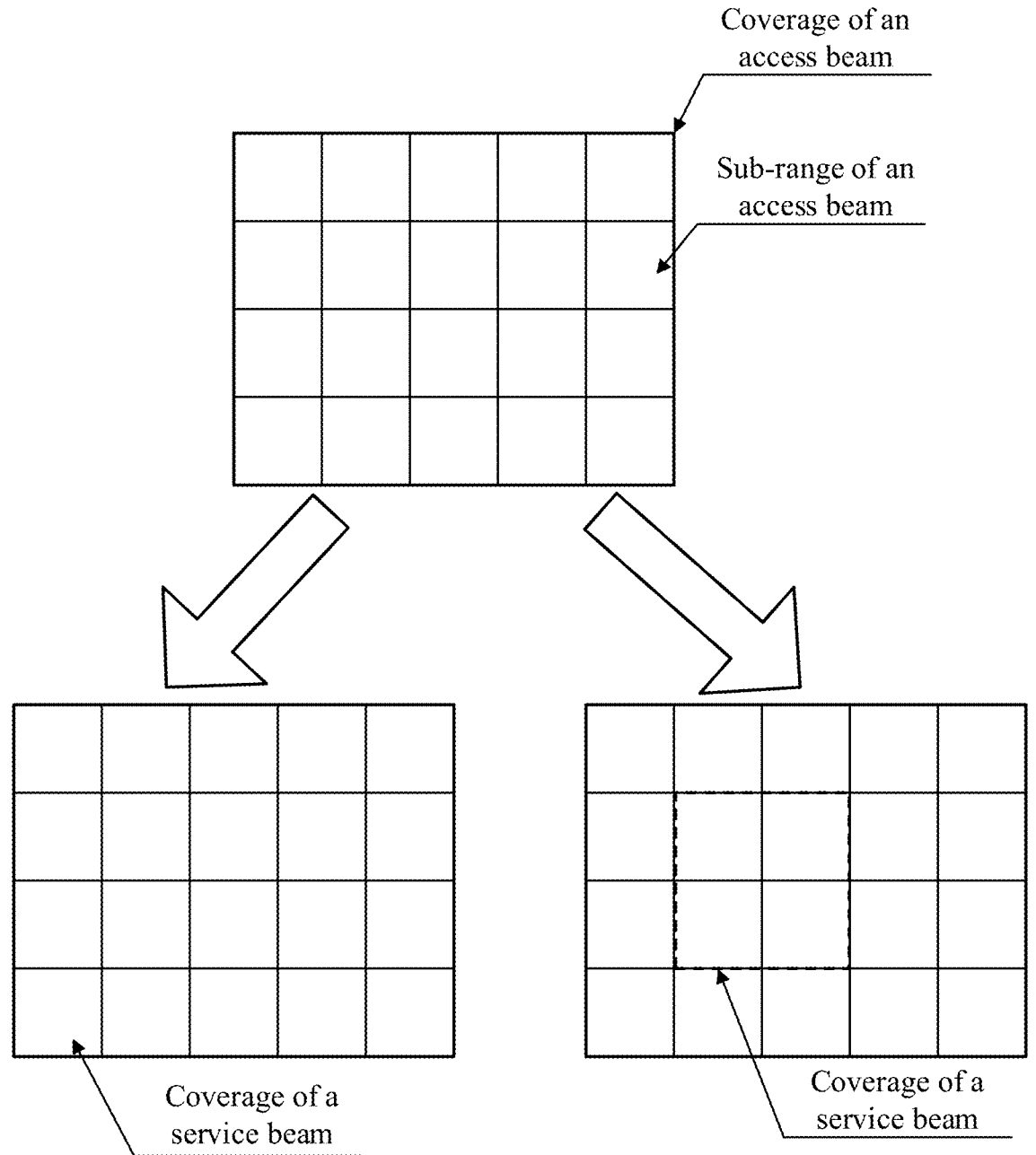
FIG. 5 is a schematic diagram of a relationship between a coverage of an access beam and a coverage of a service beam according to an embodiment of the present disclosure.

Please refer to FIG. 5, which is a schematic diagram of a relationship between a coverage of an access beam and a coverage of a service beam according to an embodiment of the present disclosure.

FIG. 5 shows the coverage of an access beam (within the thick line), and the coverage of the access beam is equally divided into 20 sub-ranges, and the network side can correspond each sub-range to one service beam. In this way, a size of the coverage area of the service beam is a size of a sub-range (as shown at the lower left in FIG. 5). If the range that can be covered by the service beam is greater than the size of one sub-range, the area composed of multiple consecutive sub-ranges can be taken as the coverage area of one service beam (as shown in the range enclosed by the dotted line at the lower right side of FIG. 5).

When the beam type of the current beam is an access beam, the beam configuration information of the current beam includes the relationship between the coverage of the access beam and the coverage of the service beam. After obtaining the above beam configuration information, the terrestrial terminal can determine the location information of the terrestrial terminal by combining its positioning information. According to the accuracy of the positioning information, the terrestrial terminal can determine its location information in the following methods.

A first positioning method: when the terrestrial terminal does not have the GNSS positioning function (that is, the accurate positioning information cannot be obtained), the positioning information of a current location of the terrestrial terminal is determined by using other positioning methods except the GNSS positioning function; and a service beam index of the service beam in the beam configuration information that corresponds to an index value of the sub-range corresponding to the positioning information is taken as the location information of the terrestrial terminal.

The above-mentioned other positioning methods can be, for example, determining the positioning information with the aid of sensors, WiFi, etc., and according to the above beam configuration information, the sub-range corresponding to the above positioning information is determined. The service beam index of the service beam in the beam configuration information of the current beam that corresponds to an index value of the sub-range corresponding to the positioning information is taken as the location information of the terrestrial terminal for reporting.

A second positioning method: when the terrestrial terminal has a GNSS positioning function, the GNSS positioning information of a current location of the terrestrial terminal is obtained based on the GNSS positioning function; and a service beam index in the beam configuration information that corresponds to the GNSS positioning information is taken as the location information of the terrestrial terminal.

In the embodiments provided in the present disclosure, by obtaining the positioning information of the terrestrial terminal, and according to the positioning information and the beam configuration information of the current beam, the service beam index of the service beam corresponding to the location of the terrestrial terminal is determined, and then the service beam index is configured as the location information of the terrestrial terminal for reporting, which can reduce the amount of data transmission, and it is suitable for reporting in the access beam, and the network side can accurately allocate a suitable service beam for the terrestrial terminal.

After or before the terrestrial terminal determines its location information, the terrestrial terminal can obtain its location reporting mode by:

receiving first information of the satellite base station; when the first information includes a signaling directly indicating the location reporting mode, determining the location reporting mode based on the signaling (equivalent to an explicit signaling); and when the first information is random access channel (RACH) configuration information of the current beam (equivalent to an implicit signaling), determining the location reporting mode based on whether there is a RACH configuration parameter in the RACH configuration information associated with the location information.

The above signaling includes a master information block (MIB) or a system information block 1 (SIB1).

The above location reporting mode includes: location reporting via at least one of a message transmitted by a random access preamble, or an uplink scheduling message carried by a PUSCH.

For example, the network side instructs the terrestrial terminal to report address information in the message transmitted by the random access preamble through the MIB, and then the terrestrial terminal, according to the obtained MIB, determines that the location reporting mode is to report the address information in the message transmitted by the random access preamble.

For another example, the network side instructs the terrestrial terminal to report address information in the message transmitted by the random access preamble and the uplink scheduling message carried by the PUSCH through the SIB, and then the terrestrial terminal, according to the obtained SIB, determines that the location reporting mode is to report the address information in the message transmitted by the random access preamble and the uplink scheduling message carried by the PUSCH.

In a possible implementation manner, based on whether there is a RACH configuration parameter associated with the location information in the RACH configuration information, the location reporting mode is determined through the following manner:

when there is a RACH configuration parameter in the RACH configuration information associated with the location information, the location information is reported in the message transmitted by the random access preamble corresponding to the current beam; and when there is no RACH configuration parameter in the RACH configuration information associated with the location information, the location information is reported in the uplink scheduling message corresponding to the current beam.

The above RACH configuration parameter may include: at least one of a PRACH format, a RACH occasion (RO) resource, and a preamble index resource of a preamble.

The above preamble index resources include: a one-level preamble index and a multi-level preamble index; and, the multi-level preamble index includes multiple one-level preamble indexes; each level of preamble indexes corresponds to one preamble index range; and adjacent two levels of preamble indexes have the same or different preamble index ranges, and take values independent of each other.

For example, when the network side carries the RACH configuration parameter associated with the location information in the RACH configuration information, the terrestrial terminal can implicitly determine the location reporting mode based on this as: reporting the location information in the message transmitted by the random access preamble. When the RACH configuration information received by the terrestrial terminal does not include the RACH configuration parameter, the implicit/indirect location reporting mode may be determined by: reporting the location information in an uplink scheduling message.

Since the random access procedure corresponding to the current beam may be a four-step random access procedure or a two-step random access procedure, the above different location reporting modes use different messages in different random access procedures, as follows.

When the random access procedure used by the current beam is a four-step random access procedure, the message transmitted by the random access preamble is a message 1 of the four-step random access procedure, and the uplink scheduling message is a message 3 of the four-step random access procedure.

For example, when the terrestrial terminal determines that the beam type of the current beam is an access beam, the random access procedure used is a four-step random access procedure, and the location reporting mode specified by the network side is to report in the message transmitted by the random access preamble, then the terrestrial terminal will report its location information through the message 1 of the four-step random access procedure.

When the random access procedure adopted by the current beam is a two-step random access procedure, a message carrying the random access preamble is the message A-PRACH of the two-step random access procedure, and a message carrying uplink scheduling message is the message A-PUSCH of the two-step random access procedure.

For example, when the terrestrial terminal determines that the beam type of the current beam is an access beam, the random access procedure used is a two-step random access procedure, and the location reporting mode specified by the network side is to report in the uplink scheduling message carried by the PUSCH, then the terrestrial terminal will report its location information through the message A-PUSCH of the two-step random access procedure.

For the terrestrial terminal, the location reporting mode of the terrestrial terminal may have the following cases.

The first case: location information is reported in the message 1 (Msg1) of the four-step random access procedure.

The second case: location information is reported in the message 3 (Msg3) of the four-step random access procedure.

The third case: location information is reported in the message A-PRACH (MsgA-PRACH) of the two-step random access procedure.

The fourth case: location information is reported in the message A-PUSCH (MsgA-PUSCH) of the two-step random access procedure.

The fifth case: location information is respectively reported in the Msg1 and Msg3 of the four-step random access procedure (that is, the same location information is reported).

The sixth case: location information is respectively reported in the MsgA-PRACH and MsgA-PUSCH of the two-step random access procedure (that is, the same location information is reported).

The location information is respectively reported in two different messages in the same random access procedure, which can increase the reliability of reporting the location information and enable the network side to obtain the location information of the terrestrial terminal.

The seventh case: location information is jointly reported in the Msg1 and Msg3 of the four-step random access procedure (that is, different parts of the location information are reported).

The eighth case: location information is jointly reported in the MsgA-PRACH and MsgA-PUSCH of the two-step random access procedure (that is, different parts of the location information are reported).

When the location information is reported jointly in two pieces of information in a random access procedure, data of the location information can be divided into two parts, and one part in each of the two pieces of information is reported.

When two messages are used to jointly report the location information of the terrestrial terminal, the location information can be divided into two parts according to a preset ratio, or according to a ratio notified by the network side through a broadcast channel. According to the preset ratio or the notified ratio, the terrestrial terminal can divide the location information into two parts, which are reported in two messages respectively.

For example, the instruction received by the terrestrial terminal is to report the location information by using the seventh case above. The location information occupies a total of 10 bits, the preset ratio is 0.6, and then the bit data corresponding to the location information is divided into the first 6 bits of data and the last 4 bits of data. The first 6 bits of data is reported through the Msg1, and the last 4 bits of data is reported through the Msg3.

In the same random access procedure, two messages are used to jointly report the location information, which can reduce the amount of data transmitted by each message, and enable the network side to quickly obtain the location information of the terrestrial terminal. In addition, by jointly reporting location information through two messages, high-precision location information with a larger amount of data can be reported, and the network side can obtain more accurate location information.

After the terrestrial terminal obtains its location reporting mode and location information, the terrestrial terminal can perform step 403.

Step 403: in the random access procedure of the current beam, the location information is reported by the location reporting mode, and the location information is configured for determining the service beam corresponding to the terrestrial terminal.

In the embodiment provided by the present disclosure, when the current beam received by the terrestrial terminal is an access beam, in the random access procedure of the access beam, the location information of the terrestrial terminal is reported to the satellite base station according to the location reporting mode specified by the satellite base station, which make the satellite base station quickly and accurately obtain the location information of the terrestrial terminal, and then allocate suitable service beams for the terrestrial terminal according to the location information of the terrestrial terminal, and the terrestrial terminal can accurately access the appropriate service beam, and then successfully access the satellite communication system.

The terrestrial terminal uses the location reporting mode indicated by the satellite base station to report the location information, which can be realized in the following ways:

when it is determined that the location reporting mode is transmission in the message transmitted by the random access preamble, the location information is reported via a message transmitted by a corresponding random access preamble in the random access procedure adopted by the current beam;

when it is determined that the location reporting mode is transmission in the uplink scheduling message, the location information is reported via a corresponding uplink scheduling message in the random access procedure adopted by the current beam;

when it is determined that the location reporting mode is respective transmission in the message transmitted by the random access preamble and the uplink scheduling message, the location information is respectively reported via the message transmitted by a corresponding random access preamble and uplink scheduling message, in the random access procedure adopted by the current beam; and when it is determined that the location reporting mode is joint transmission in the message transmitted by the random access preamble and the uplink scheduling message, the location information is divided into two parts, and the parts of the location information is respectively reported via the message transmitted by a corresponding random access preamble and uplink scheduling message, in the random access procedure adopted by the current beam.

For example, when the satellite base station indicates that the location reporting mode is transmission in the uplink scheduling message, if the random access procedure used is a four-step random access procedure, the terrestrial terminal reports the address information in the message 3 of the four-step random access procedure; and if the random access procedure used is a two-step random access procedure, the terrestrial terminal reports the address information in the message A-PUSCH of the two-step random access procedure.

When the satellite base station indicates that the location reporting mode is transmission in the message transmitted by the random access preamble, if the random access procedure used is a four-step random access procedure, the terrestrial terminal reports the address information in the message 1 of the four-step random access procedure; and if the random access procedure used is a two-step random access procedure, the terrestrial terminal reports the address information in the message A-PRACH of the two-step random access procedure.

When the satellite base station indicates that the location reporting mode is respective transmission in the message transmitted by the random access preamble and the uplink scheduling message, if the four-step random access procedure is configured, the terrestrial terminal respectively reports the complete address information in the message 1 and the message 3 of the four-step random access procedure; and if the random access procedure used is a two-step random access procedure, the terrestrial terminal respectively reports the complete address information in the message A-PRACH and the message A-PUSCH of the two-step random access procedure.

When the satellite base station indicates that the location reporting mode is joint transmission in the message transmitted by the random access preamble and the uplink scheduling message, the terrestrial terminal divides the location information into two parts (part A and part B). If the four-step random access procedure is configured, part A of the location information is reported in the message 1 of the four-step random access procedure, and part B of the address information is reported in the message 3; and if the random access procedure used is the two-step random access procedure, the terrestrial terminal reports part A of the location information in the message A-PRACH of the two-step random access procedure, and reports part B of the address information in the message A-PUSCH.

When the terrestrial terminal reports the address information or part of the information in the message A-PUSCH, it can be directly reported in the data part of the message A-PUSCH, or indirectly reported in the PUSCH DMRS of the message A-PUSCH, for example, different bits in the corresponding bits of the location information correspond to different scrambling sequences of the PUSCH DMRS.

In the above reporting modes, when the terrestrial terminal uses the data part of the message 3 and the message A-PUSCH to report, the reporting mode belongs to explicit reporting (that is, the location information of the terrestrial terminal is directly reported); and the other modes belong to implicit reporting (that is, the location information of the terrestrial terminal is indirectly reported through other information). When implicit reporting is configured, the location information of the terrestrial terminal is indirectly reported by using other information without transmitting bit data of the actual location information, so the amount of data transmission can be effectively saved.

In a possible implementation manner, reporting the location information via the message transmitted by the corresponding random access preamble may be implemented in the following way:

a current value of the RACH configuration parameter corresponding to the location information is determined based on a corresponding relationship between bits or values occupied by the location information and values of the RACH configuration parameter; and in the random access procedure adopted by the current beam, the current value is reported in the message transmitted by the corresponding random access preamble.

Figure 6:
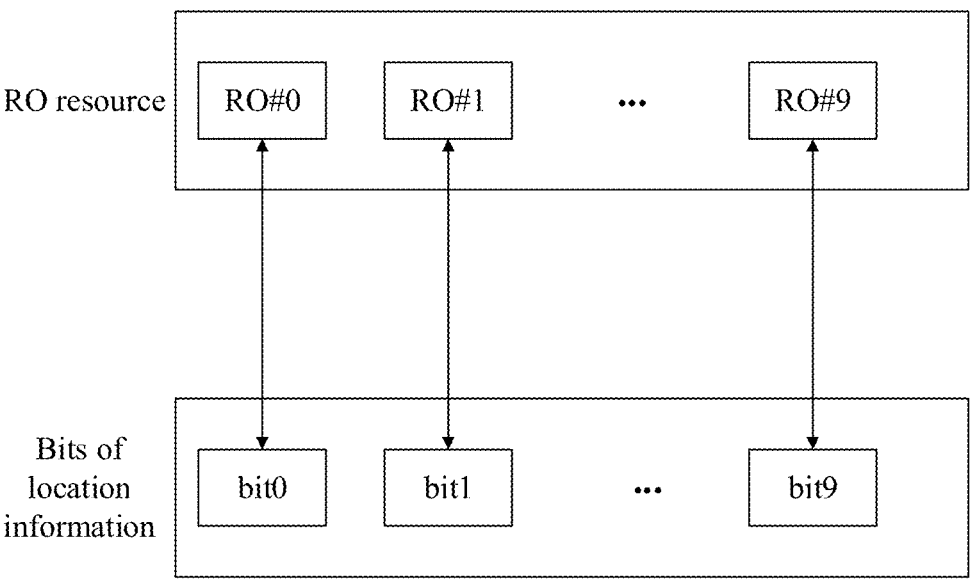
FIG. 6 is a schematic diagram of a corresponding relationship between bits of location information and RO resources according to an embodiment of the present disclosure.

For example, taking the RACH parameter as RO resources and the total number of bits occupied by the location information as 10 bits for an example, the network side predefines a corresponding relationship between 10 bits occupied by the location information and RO resources, as shown in FIG. 6, which is a schematic diagram of a corresponding relationship between bits of location information and RO resources according to the embodiment of the present disclosure. The RO resources in FIG. 6 include RO indexes: RO #0-RO #9, which are in one-to-one correspondence with the 10 bits corresponding to the location information. If the binary data of the location information is 0000100100, it can be determined through the above corresponding relationship that the RO indexes: RO #4 and RO #7 (recorded as the current values corresponding to the RO resource), need to be used; and then RO #4 and RO #7 are used in the message 1 in the four-step random access procedure of the current beam, so the network side can determine that the location information of the terrestrial terminal is 0000100100.

Figure 7:
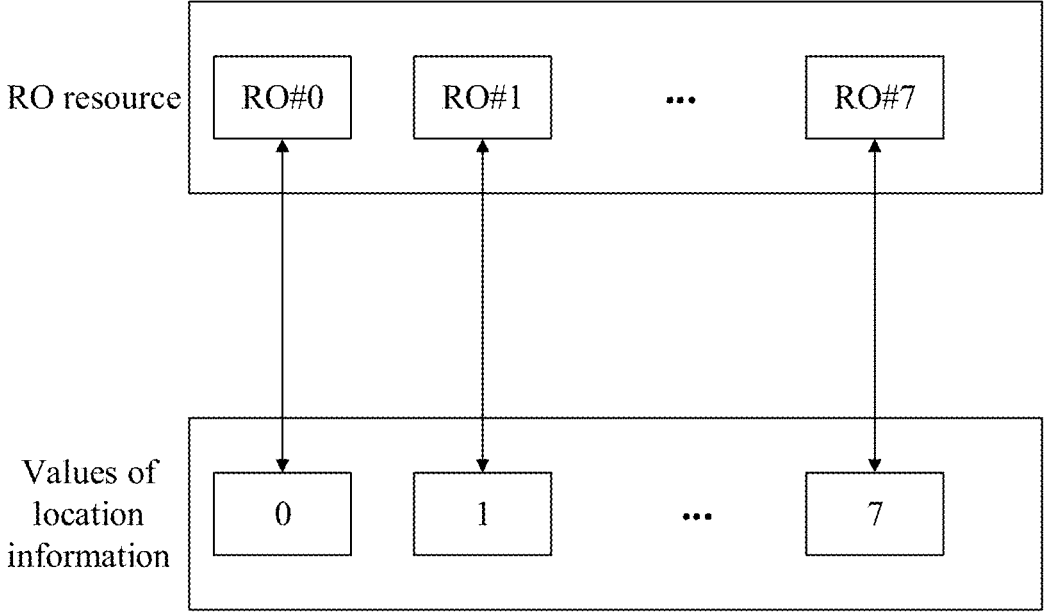
FIG. 7 is a schematic diagram of a corresponding relationship between values of location information and RO resources according to an embodiment of the present disclosure.

As another example, the possible values of the location information include 0 to 7, and the RACH parameter is RO resources (RO #0-RO #7). Please refer to FIG. 7, FIG. 7 is a schematic diagram of a corresponding relationship between values of location information and RO resources according to an embodiment of the present disclosure. The RO resources in FIG. 7 include RO indexes: RO #0-RO #7, which are in one-to-one correspondence with 8 possible values (0-7, these values are service beam indexes) corresponding to the location information. If the terrestrial terminal determines that the location information is 5, then RO #5 is configured in the message 1 in the four-step random access procedure of the current beam, and the satellite base station can determine that the location information of the terrestrial terminal is 5.

In a possible implementation manner, the total number of bits occupied by the location information is log 2(R); and, R is a size of a value range of the RACH configuration parameter, and log 2( ) indicates a logarithm with a base of 2.

In the embodiments according to the present disclosure, the service beam indexes used when the terrestrial terminal reports the location information, and the total number of service beams included in one access beam are usually fixed, so the total number of bits occupied by the location information can be determined according to the total number of service beams included in the access beam. Assuming that the total number of service beams included in one access beam is R, the total number of bits occupied by the location information (denoted as M) can be determined by the following formula:

$$M = \log2(R).$$

For example, assuming that there are 8 service beams in one access beam of the satellite base station, according to the above formula, the total number of bits occupied by the location information can be determined as M=log 2(8)=3.

Figure 8:
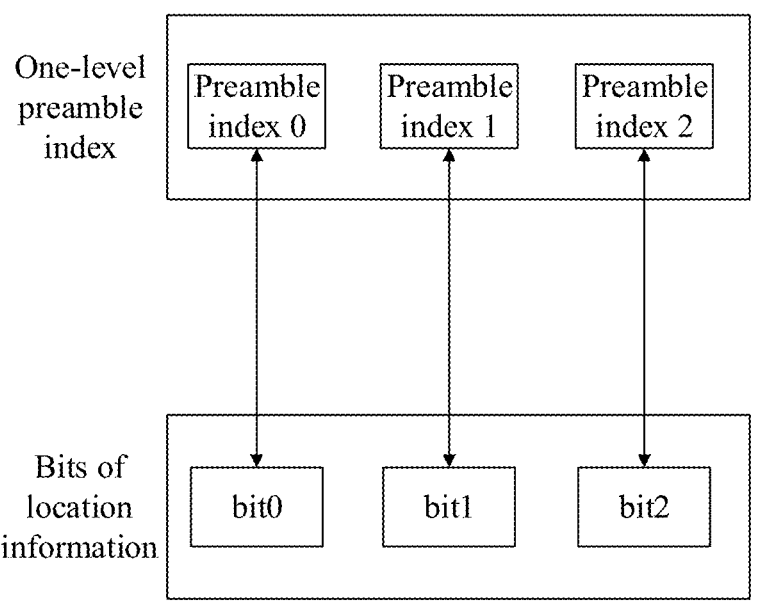
FIG. 8 is a schematic diagram of a corresponding relationship between bits of location information and a one-level preamble index according to an embodiment of the present disclosure.

Assuming that the RACH configuration parameter is one-level preamble indexes, the network side can predefine a corresponding relationship between 3 bits of location information and three one-level preamble indexes. Please refer to FIG. 8, which is a schematic diagram of a corresponding relationship between bits of location information and a one-level preamble index according to an embodiment of the present disclosure, herein the preamble indexes 0~2 are in one-to-one correspondence with bit0~bit2 of the location information. The satellite base station notifies the above corresponding relationship to the terrestrial terminal through the system broadcast or signaling, and the terrestrial terminal can report the location information by using the one-level preamble index in the Msg1 according to the above corresponding relationship when reporting the location information.

In a possible implementation manner, when the location information is indicated by a multi-level preamble index, bits corresponding to the total number of bits or all values of the location information are divided into multiple sets in a preset order, the multiple sets are in one-to-one correspondence with the multi-level preamble index, and bits or values of the location information in each set are in one-to-one correspondence with preamble indexes in a corresponding level of preamble indexes. Herein, the preset order includes: the order of the location information from a high bit to a low bit, or the order of the location information from a low bit to a high bit.

For example, when the total number of bits occupied by the location information is 12 bits, the multi-level preamble index is a two-level preamble index, and the preset order is from a low bit to a high bit, then the above 12 bits are sequentially divided into two sets according to the order from a low bit to a high bit. Each set includes 6 bits, the above two sets are in one-to-one correspondence with two one-level preamble indexes in the two-level preamble index, and each one-level preamble index includes 6 preambles, so 6 bits in each set are in one-to-one correspondence with 6 preambles in the corresponding one-level preamble.

For another example, the possible values of the location information include 1 to 8, dividing 1 to 4 into set A and 5 to 8 into set B. Four preamble indexes included a one-level preamble index of the two-level preamble index are in one-to-one correspondence with the 4 values in the set A, and four preamble indexes included in the other one-level preamble are in one-to-one correspondence with the 4 values in the set B.

Figure 9:
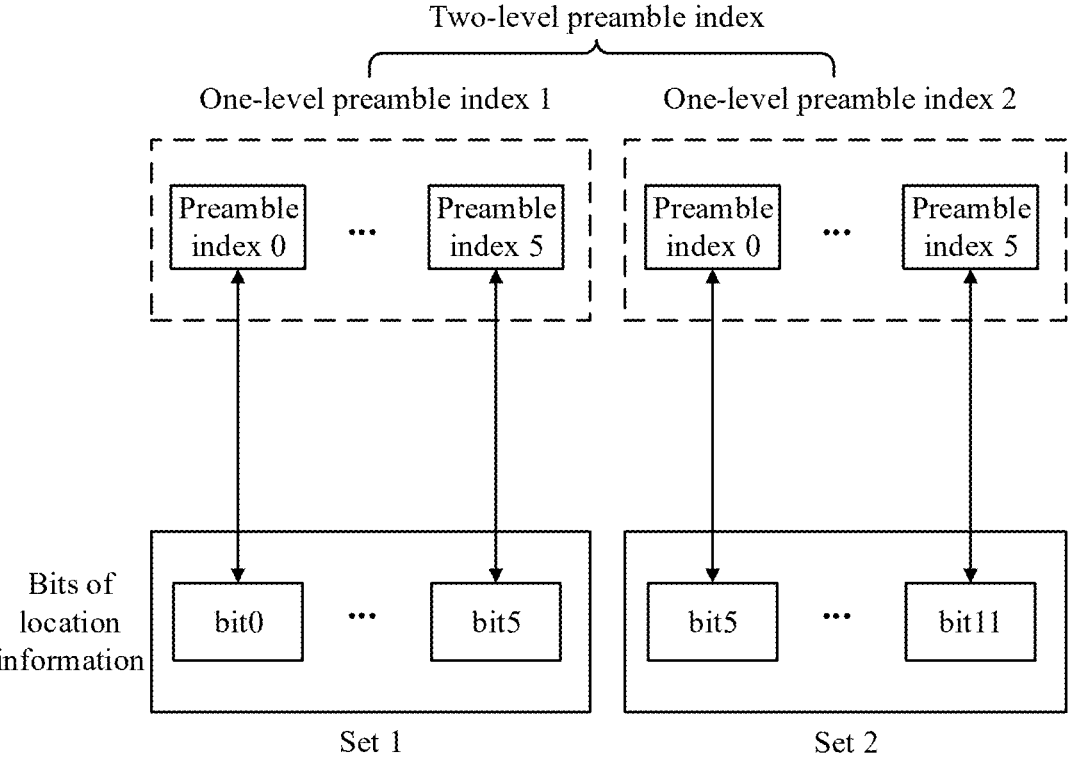
FIG. 9 is a schematic diagram of a corresponding relationship between bits of location information and a two-level preamble index according to an embodiment of the present disclosure.

Please refer to FIG. 9, which is a schematic diagram of a corresponding relationship between bits of location information and a two-level preamble index according to an embodiment of the present disclosure. In FIG. 9, 12 bits occupied by the location information are divided into two sets (set 1 and set 2), the set 1 includes bit0~bit5, and the set 2 includes bit6~bit11. The set 1 and set 2 are respectively in one-to-one correspondence with two one-level preamble indexes of two-level preamble index, 6 bits (bit0~bit5) in the set 1 are in one-to-one correspondence with 6 preamble indexes (preamble indexes 0~5) in the one-level preamble index 1, and 6 bits (bit6~bit11) in the set 2 are in one-to-one correspondence with 6 preamble indexes (preamble indexes 0~5) in the one-level preamble index 2.

In the embodiments according to the present disclosure, the preamble indexes belonging to different one-level preamble indexes in the multi-level preamble index may be the same or different, and the details are not limited.

In the embodiments according to the present disclosure, in addition to indirect indication through a single RACH configuration parameter, the location information can also be jointly indicated through multiple RACH configuration parameters. When the location information is jointly indicated by the RO resource and the preamble index resource, one RO carries a one-level preamble index.

When the location information is jointly indicated by the RO resource and the preamble index resource, the location information may be jointly indicated by the RO resource and the one-level preamble index, or may also be jointly indicated by the RO resource and the multi-level preamble index.

Figure 10:
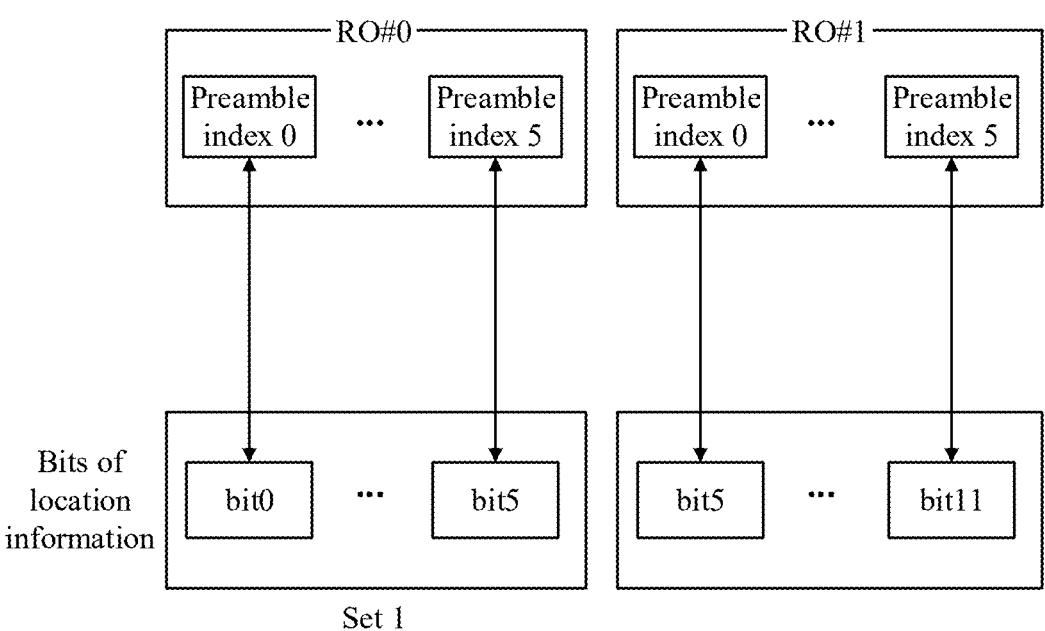
FIG. 10 is a schematic diagram of a corresponding relationship between a RO resource and a one-level preamble index jointly indicating location information according to the embodiment of the present disclosure.

Please refer to FIG. 10, which is a schematic diagram of a corresponding relationship between a RO resource and a one-level preamble index jointly indicating location information according to the embodiment of the present disclosure.

FIG. 10 shows two ROs (RO #0, RO #1), each RO carries 6 preamble indexes, 6 preamble indexes carried by RO #0 are in one-to-one correspondence with bit0~bit5 of the location information, and 6 preamble indexes carried by RO #1 are in one-to-one correspondence with bits6~bit11 of the location information.

By using the corresponding relationship shown in FIG. 10, the terrestrial terminal can jointly indicate location information through RO #0 and RO #1 (RO resources) as well as the one-level preamble index.

Figure 11:
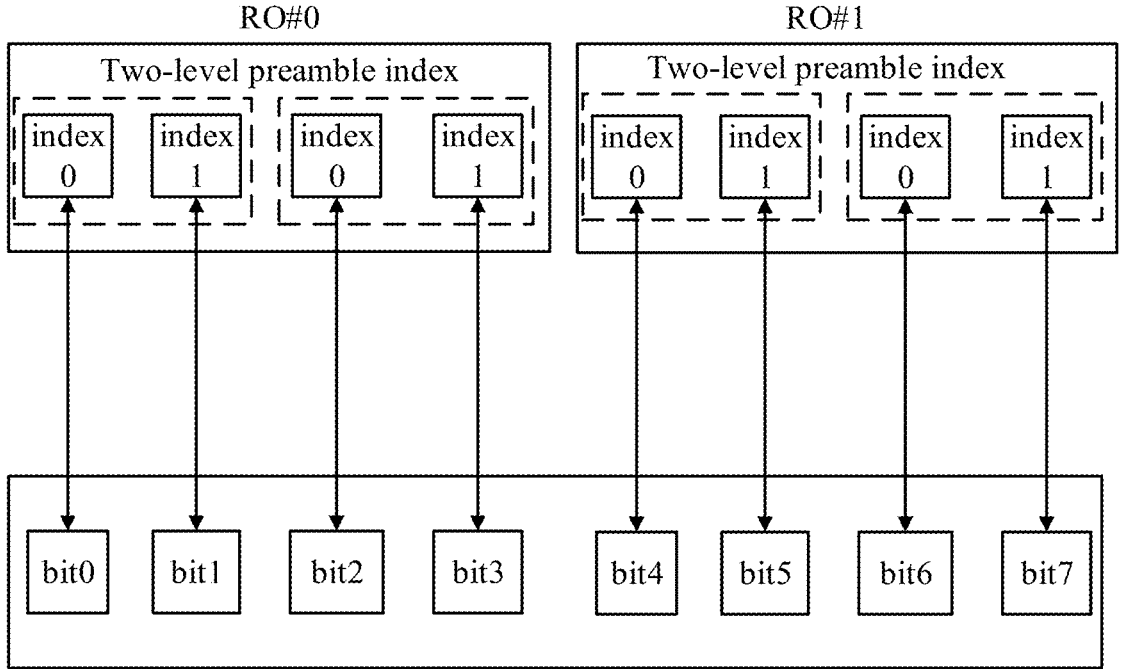
FIG. 11 is a schematic diagram of a corresponding relationship between a RO resource and a two-level preamble index jointly indicating location information according to the embodiment of the present disclosure.

Please refer to FIG. 11, which is a schematic diagram of a corresponding relationship between a RO resource and a two-level preamble index jointly indicating location information according to the embodiments of the present disclosure.

FIG. 11 shows two ROs (RO #0, RO #1), each RO carries a two-level preamble index, and two preamble indexes (index0, index1) in each level of the two-level preamble index carried by RO #0 are in one-to-one correspondence with two bits of the location information. The network side can inform the terrestrial terminal of the corresponding relationship in FIG. 11, and when the terrestrial terminal reports the location information, the terrestrial terminal jointly reports the location information according to the corresponding relationship and the two-level preamble index.

In a possible implementation manner, reporting the location information via the corresponding uplink scheduling message may be implemented in the following manner: the location information is reported via at least one of data part of the PUSCH carrying the uplink scheduling message or a PUSCH DMRS, or the location information is jointly reported via data part of the PUSCH carrying the uplink scheduling message and a PUSCH DMRS.

When the location information is reported in the terrestrial terminal through the uplink scheduling message, since the random access procedure used by the current beam may be a four-step random access procedure or a two-step random access procedure, the above reporting modes correspond to the following modes.

Mode 1: in the four-step random access procedure, data part of the PUSCH of the Msg3 is configured to carry the above location information (explicit reporting mode).

Mode 2: in the four-step random access procedure, the PUSCH DMRS of the Msg3 is configured to carry the above location information (implicit reporting mode).

Mode 3: in the four-step random access procedure, data part of the PUSCH of the Msg3 and the PUSCH DMRS are used to jointly carry the above location information. That is, the data part of the PUSCH is configured to explicitly report the data corresponding to some bits of the location information, and the PUSCH DMRS is configured to implicitly report the data corresponding to the remaining bits of the location information.

Mode 4: in the two-step random access procedure, data part of the PUSCH of the MsgB is configured to carry the above location information (explicit reporting mode).

Mode 5: in the two-step random access procedure, the PUSCH DMRS of the MsgB is configured to carry the above location information (implicit reporting mode).

Mode 6: in the two-step random access procedure, data part of the PUSCH of the MsgB and the PUSCH DMRS are used to jointly carry the above location information. That is, data part of the PUSCH is configured to explicitly report the data corresponding to some bits of the location information, and the PUSCH DMRS is configured to implicitly report the data corresponding to the remaining bits of the location information.

For example, taking the four-step random access procedure adopted by the current beam as an example, the above location information can be as data, which may be reported via data part of the PUSCH of the Msg3 and may also be implicitly reported via the PUSCH DMRS of the Msg3, in the four-step random access procedure.

Figure 12:
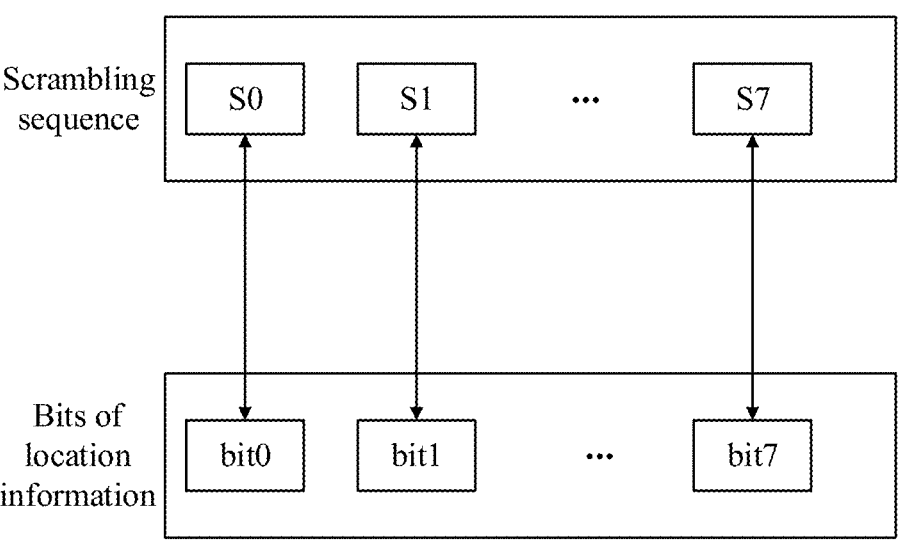
FIG. 12 is a schematic diagram of a corresponding relationship between bits of location information and scrambling sequences of the PUSCH DMRS according to the embodiment of the present disclosure.

Please refer to FIG. 12, which is a schematic diagram of a corresponding relationship between bits of location information and scrambling sequences of the PUSCH DMRS according to the embodiments of the present disclosure.

In FIG. 12, the total number of bits of the location information as 8 is taken an example, 8 bits (bit0~bit7) are in correspondence with 8 scrambling sequences (S0~S7) of the PUSCH DMRS. When reporting the location information, the terrestrial terminal can use the corresponding scrambling sequence to scramble according to the above corresponding relationship, and then indirect reporting of the location information can be completed.

When jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; and, the preset order includes an order of the location information from a high bit to a low bit, or an order of the location information from a low bit to a high bit.

Figure 13:
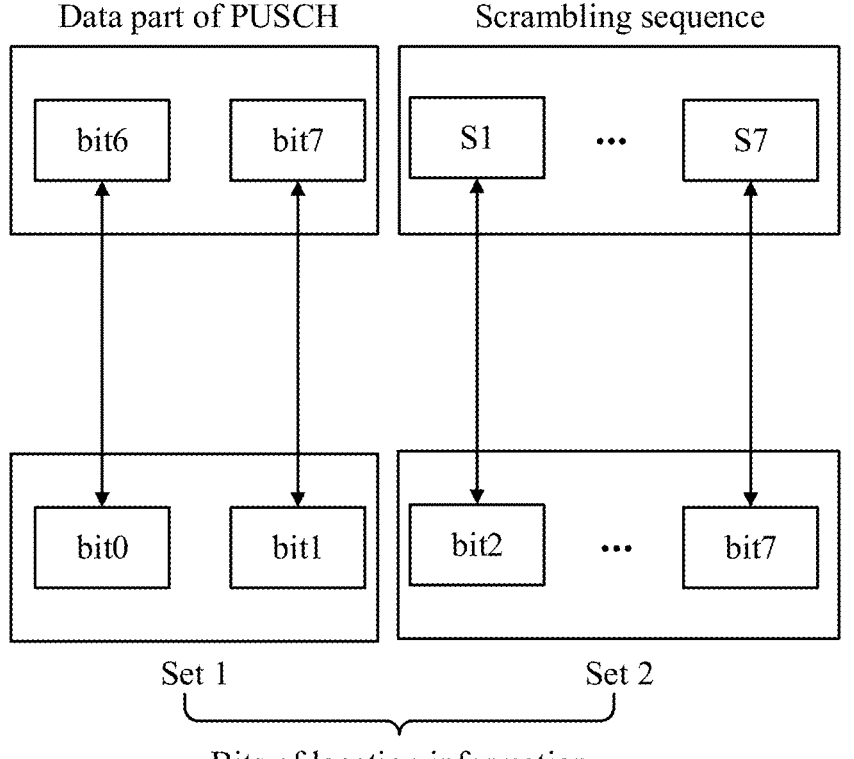
FIG. 13 is a schematic diagram of a corresponding relationship between bits of location information, and bits of data part of the PUSCH and scrambling sequences of the PUSCH DMRS according to the embodiment of the present disclosure.

Please refer to FIG. 13, which is a schematic diagram of a corresponding relationship between bits of location information, and bits of data part of the PUSCH and scrambling sequences of the PUSCH DMRS according to the embodiments of the present disclosure.

Still taking the total number of bits of location information as 8 for an example, the terrestrial terminal can divide 8 bits into two sets, and the specific division method can refer to the aforementioned division method. The two sets (set 1: bit0~bit1, and set 2: bit2~bit7) are obtained, herein, 2 bits in the set 1 are in one-to-one correspondence with 2 bits in the data part of the PUSCH, and 6 bits in the set 2 are in one-to-one correspondence with 6 scrambling sequences (S0~S5) of the PUSCH DMRS. When reporting the location information, the terrestrial terminal, according to the above corresponding relationship, uses 2 bits in the data part of the PUSCH and the corresponding scrambling sequences of the PUSCH DMRS to scramble, and then joint reporting of the location information can be completed.

It should be understood that, in the embodiments according to the present disclosure, bits, corresponding to the bits of the location information, in the data part of the PUSCH may be continuous or discontinuous; and scrambling sequences, corresponding to the bits of the location information, in the scrambling sequences of the PUSCH DMRS may be continuous or non-continuous, which is not limited here.

When the random access procedure adopted by the current access beam is a two-step random access procedure, the corresponding modes of mode 4 to mode 6 are similar to those of mode 1 to mode 3, and details will not be repeated.

After the terrestrial terminal completes reporting of the location information by any of the above modes, the satellite base station receives the above location information in the corresponding message of the corresponding random access procedure, then adapts the corresponding service beam for the terrestrial terminal according to the received location information of the terrestrial terminal, and then sends relevant configuration information of the service beam to the terrestrial terminal through the Msg2 or Msg4 or MsgA, and the terrestrial terminal completes the random access procedure of the service beam based on the relevant configuration information of the service beam.

It should be understood that, the corresponding relationship between the bits of the location information and each RACH configuration parameter in the above FIG. 8 to FIG. 13 can also be changed to the corresponding relationship between the values of the location information and each RACH configuration parameter similar to FIG. 7, and details will not be repeated.

In the embodiments according to the present disclosure, the location information of the terrestrial terminal is determined by the corresponding relationship between the values of the location information and the values of the RACH configuration parameter in combination with the positioning information of the terrestrial terminal, which can implicitly report the location information by using the least amount of resources when reporting.

The above mainly introduces the method of random access to the satellite communication system on the terrestrial terminal side, and the following will be introduced on the satellite base station side.

One embodiment of the present disclosure provides a random access method, which is performed by a satellite base station of a satellite communication system. Please refer to FIG. 14, the method includes:

step 1401: sending a system broadcast message, and the terrestrial terminal determines a beam type of a current beam and a random access procedure of the current beam based on the system broadcast message; and, the beam type includes an access beam and a service beam;

step 1402: when the beam type of the current beam is an access beam, notifying the terrestrial terminal of reporting the location reporting mode of a current location of the terrestrial terminal; and, the terrestrial terminal adopts the above random access method on the terrestrial terminal side to access the satellite base station;

step 1403: in the random access procedure of the current beam, receiving the location information of the current location of the terrestrial terminal via the location reporting mode; and step 1404: scheduling a corresponding service beam for the terrestrial terminal based on the location information, and generating and sending corresponding service beam configuration information, to control the terrestrial terminal to complete the random access procedure in the service beam.

In the current beam, the broadcast information sent by the satellite base station includes the beam type of the current beam and the random access procedure adopted. The random access procedure may be a four-step random access procedure or a two-step random access procedure.

The above beam type can be an access beam or a service beam. If the beam type of the current beam is an access beam, the satellite base station may also notify the terrestrial terminal of the location reporting mode that should be used to report the location information of the current location of the terrestrial terminal. The notification may be made directly through the signaling that directly indicates the unknown reporting mode, or may be made indirectly through the implicit signaling (e.g., whether there is a RACH configuration parameter in the RACH configuration information that is associated with the location information). The specific solution of the above location reporting mode may refer to the relevant introduction of the terrestrial terminal mentioned above, and will not be repeated here.

After determining the beam type of the current beam as an access beam, as well as the random access procedure adopted and the location reporting mode, the terrestrial terminal uses the above random access method on the terrestrial terminal side to complete the location information reporting. In the random access procedure of the current beam, the satellite base station receives the location information of the current location of the terrestrial terminal via the location reporting mode, schedules the corresponding service beam for the terrestrial terminal based on the location information, and generates and sends the corresponding service beam configuration information, to control the terrestrial terminal to complete the random access procedure in the service beam.

In order to enable understanding of the embodiments, the following examples are given.

Figure 15:
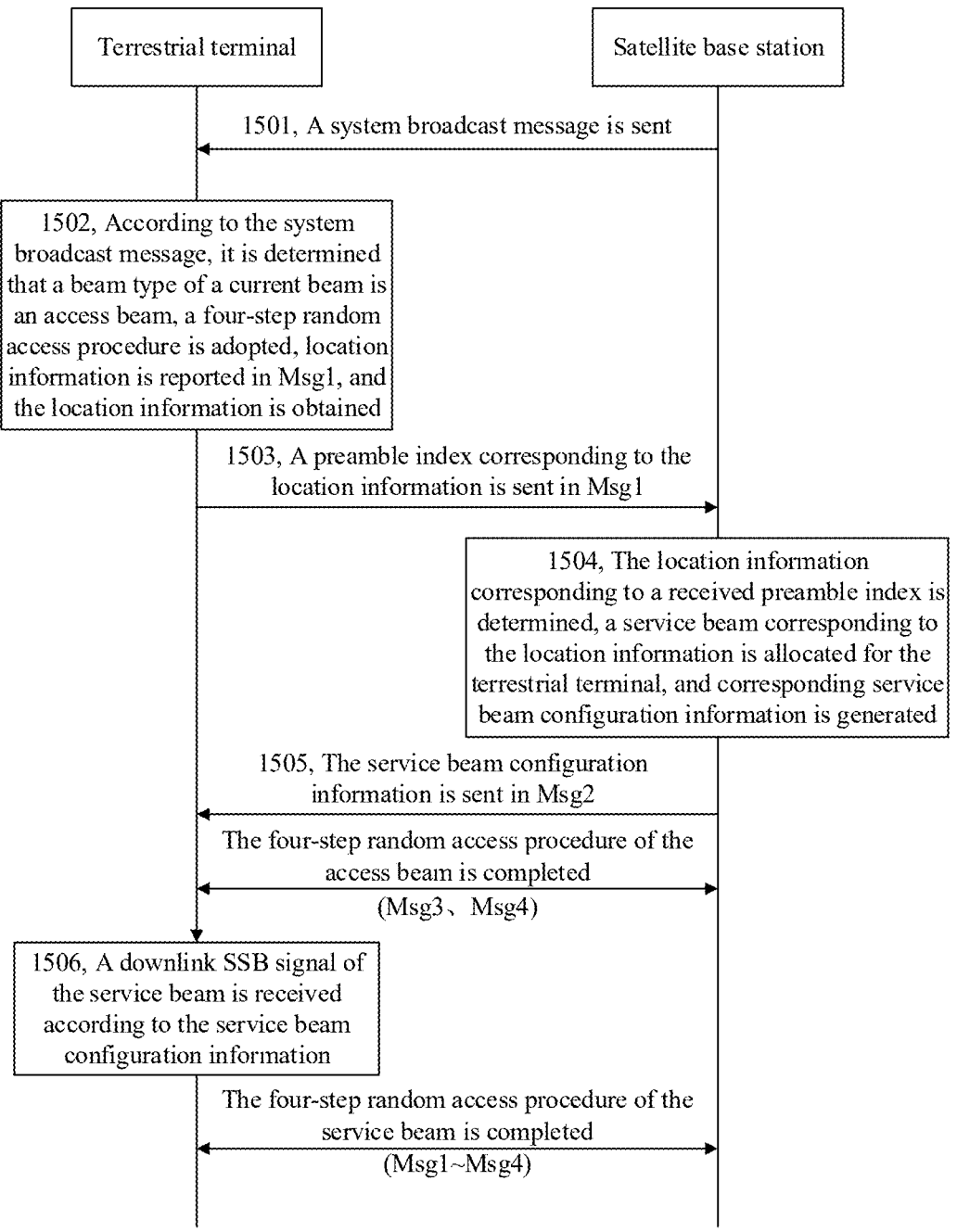
FIG. 15 is a schematic diagram of interaction between a satellite base station and a terrestrial terminal in a four-step random access procedure according to an embodiment of the present disclosure.

It's assumed that the current beam sent by the satellite base station is an access beam, the random access procedure adopted is a four-step random access procedure, and the specified location reporting mode is to report in the message transmitted by the random access preamble. Please refer to FIG. 15, which is a schematic diagram of interaction between a satellite base station and a terrestrial terminal in a four-step random access procedure according to an embodiment of the present disclosure.

Step 1501: a system broadcast message is sent.

The satellite base station sends the system broadcast message that carries the beam type of the current beam as an access beam and the random access procedure adopted as a four-step random access procedure to the terrestrial terminal, and the system broadcast message may also include the location reporting mode of the location information of the terrestrial terminal (reporting in the Msg1).

Step 1502: according to the system broadcast message, it is determined that the beam type of the current beam is an access beam, a four-step random access procedure is adopted, the location information is reported in the Msg1, and the location information is obtained.

After receiving the above system broadcast message, according to the system broadcast message, the terrestrial terminal can determine that the beam type of the current beam is the access beam, the four-step random access procedure is adopted, and the location information is reported in the Msg1.

In addition, if the beam configuration information of the current beam has been stored in the terrestrial terminal, there is no need to obtain it again; and if the beam configuration information of the current beam has not been stored, there is a need to obtain it. If the satellite base station informs the terrestrial terminal through the signaling that directly indicates the location reporting mode, the terrestrial terminal directly obtains the location reporting mode through this signaling; and if the satellite base station informs the terrestrial terminal through the implicit signaling that indirectly indicates the location reporting mode, the terrestrial terminal obtains the location reporting mode through the implicit signaling. The above beam configuration information includes all sub-ranges included in the coverage of the current beam, one or more sub-ranges in the current beam correspond to one service beam in the current beam, and the sub-ranges corresponding to different service beams are different.

Assuming that the terrestrial terminal has a GNSS positioning function, the terrestrial terminal obtains the GNSS positioning information of its current location, determines the service beam index corresponding to the GNSS positioning information based on the above beam configuration information, and uses the determined service beam index as the location information of the terrestrial terminal.

According to the corresponding relationship between the location information and the preamble index resources, the preamble index corresponding to the location information is determined.

Step 1503: the preamble index corresponding to the location information is sent in the Msg1.

The terrestrial terminal sends the determined preamble index to the satellite base station in the Msg1.

Step 1504: the location information corresponding to the received preamble index is determined, a service beam corresponding to the location information is allocated for the terrestrial terminal, and the corresponding service beam configuration information is generated.

After receiving the above preamble index, the satellite base station determines the corresponding location information according to the corresponding relationship between the location information and the preamble index resource, allocates the corresponding service beam for the terrestrial terminal according to the location information, and generates the corresponding service beam configuration information.

Step 1505: the service beam configuration information is sent in the Msg2.

The satellite base station sends the above service beam configuration information to the terrestrial terminal in the Msg2 (or Msg4).

In addition, the terrestrial terminal also needs to complete the four-step random access procedure (Msg3, Msg4) of the access beam.

Step 1506: the downlink SSB signal of the service beam is received according to the service beam configuration information.

After the terrestrial terminal completes the four-step random access procedure of the access beam and obtains the service beam configuration information, the terrestrial terminal can receive the downlink synchronization signal and PBCH block (SSB) signal of the service beam according to the service beam configuration information, and then completes four-step random access procedure of the service beam (Msg1~Msg4).

Figure 16:
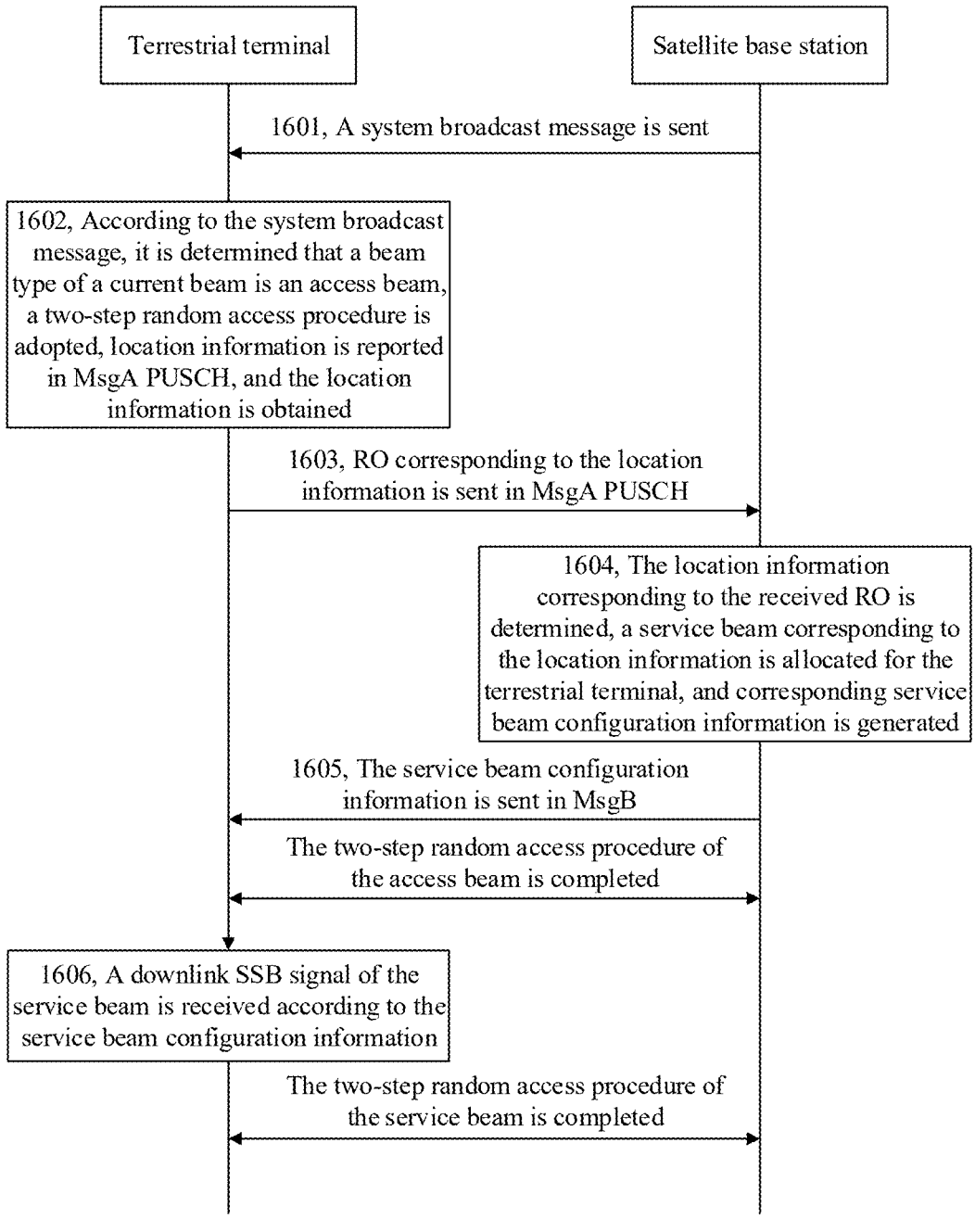
FIG. 16 is a schematic diagram of interaction between a satellite base station and a terrestrial terminal in a two-step random access procedure according to an embodiment of the present disclosure.

It is assumed that the current beam sent by the satellite base station is an access beam, the random access procedure adopted is a two-step random access procedure, the specified location reporting mode is to report in the uplink scheduling message carried by the PUSCH, and the RACH configuration parameter used is RO resources, please refer to FIG. 16, which is a schematic diagram of interaction between a satellite base station and a terrestrial terminal in a two-step random access procedure according to an embodiment of the present disclosure.

Step 1601: a system broadcast message is sent.

The satellite base station sends the system broadcast message that carries the beam type of the current beam being an access beam and the random access procedure adopted being a two-step random access procedure to the terrestrial terminal, herein the system broadcast message may also include the location reporting mode of the location information of the terrestrial terminal (reporting in the MsgA PUSCH).

Step 1602: according to the system broadcast message, the beam type of the current beam is determined as the access beam, a two-step random access procedure is adopted, the location information is reported in the MsgA PUSCH, and the location information is obtained.

After receiving the above system broadcast message, the terrestrial terminal can determine that, according to the system broadcast message, the beam type of the current beam is an access beam, a two-step random access procedure is adopted, and the location information is reported in the uplink scheduling message corresponding to the MsgA PUSCH.

In the two-step random access procedure, the method of the terrestrial terminal obtaining its location information is similar to that in the four-step random access procedure, and will not be repeated here.

The terrestrial terminal determines the RO corresponding to the location information according to the corresponding relationship between the location information and the RO resource.

Step 1603: the RO corresponding to the location information is sent in the MsgA PUSCH.

The terrestrial terminal sends the determined preamble index to the satellite base station in the Msg1.

Step 1604: the location information corresponding to the received RO is determined, a service beam corresponding to the location information is allocated for the terrestrial terminal, and the corresponding service beam configuration information is generated.

After receiving the above preamble index, the satellite base station determines the corresponding location information according to the corresponding relationship between the location information and the preamble index resource, allocates the corresponding service beam for the terrestrial terminal according to the location information, and generates the corresponding service beam configuration information.

Step 1605: the service beam configuration information is sent in the MsgB.

The satellite base station sends the above service beam configuration information to the terrestrial terminal in the MsgB.

The terrestrial terminal completes the two-step random access procedure of the access beam.

Step 1606: the downlink SSB signal of the service beam is received according to the service beam configuration information.

After completing the two-step random access procedure of the access beam and obtaining the service beam configuration information, the terrestrial terminal can receive the SSB signal of the service beam according to the service beam configuration information, and then complete the two-step random access procedure of the service beam.

Figure 17:
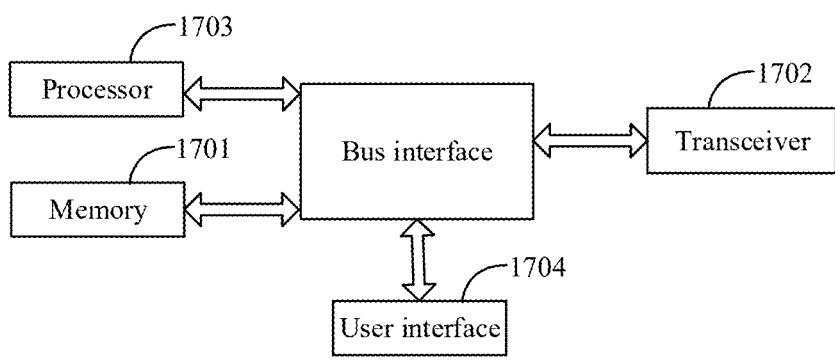
FIG. 17 is a schematic structural diagram of a terrestrial terminal according to an embodiment of the present disclosure.

As shown in FIG. 17, a terrestrial terminal according to an embodiment of the present disclosure includes a memory 1701, a transceiver 1702, and a processor 1703. The memory 1701 is configured to store computer programs; the transceiver 1702 is configured to send and receive data under the control of the processor 1703; and the processor 1703 is configured to read the computer programs in the memory 1701 and perform:

obtaining a beam type of a current beam and a random access procedure of the current beam from a received system broadcast message from a satellite base station; and the beam type includes an access beam and a service beam;

obtaining a location reporting mode of the terrestrial terminal in case that the beam type of the current beam is the access beam; and the location reporting mode is configured for indicating a location reporting way of the terrestrial terminal; and reporting location information by the location reporting mode in the random access procedure of the current beam; and the location information is configured for determining the service beam corresponding to the terrestrial terminal.

In a possible implementation manner, the processor 1703 is further configured to:

obtain beam configuration information of the current beam; and, in case that the beam type of the current beam is the access beam, the beam configuration information includes sub-ranges included in a coverage of the current beam, one or more sub-ranges of the current beam corresponds to one service beam in the current beam, and different service beams correspond to different sub-ranges;

in case that the terrestrial terminal does not have a GNSS positioning function, determine positioning information of a current location of the terrestrial terminal by using other positioning methods except the GNSS positioning function; and take a service beam index of the service beam in the beam configuration information that corresponds to an index value of the sub-range corresponding to the positioning information, as the location information of the terrestrial terminal; and in case that the terrestrial terminal has a GNSS positioning function, obtain GNSS positioning information of a current location of the terrestrial terminal based on the GNSS positioning function; and take a service beam index in the beam configuration information that corresponds to the GNSS positioning information, as the location information of the terrestrial terminal.

In a possible implementation manner, the processor 1703 is further configured to:

receive first information of the satellite base station;

in case that the first information includes a signaling directly indicating the location reporting mode, determine the location reporting mode based on the signaling; and in case that the first information is random access channel (RACH) configuration information of the current beam, determine the location reporting mode based on whether there is a RACH configuration parameter in the RACH configuration information associated with the location information.

In a possible implementation manner, the location reporting mode includes: location reporting via at least one of a message transmitted by a random access preamble, or an uplink scheduling message carried by a PUSCH.

In a possible implementation manner, in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure.

In a possible implementation manner, the signaling includes: a MIB or a SIB1.

In a possible implementation manner, the processor 1703 is further configured to:

in case that there is a RACH configuration parameter in the RACH configuration information associated with the location information, report the location information in the message transmitted by the random access preamble corresponding to the current beam; and in case that there is no RACH configuration parameter in the RACH configuration information associated with the location information, report the location information in the uplink scheduling message corresponding to the current beam.

In a possible implementation manner, the processor 1703 is further configured to:

in case that the location reporting mode is transmission in the message transmitted by the random access preamble, report the location information via the message transmitted by a corresponding random access preamble, in the random access procedure adopted by the current beam;

in case that the location reporting mode is transmission in the uplink scheduling message, report the location information via a corresponding uplink scheduling message in the random access procedure adopted by the current beam;

in case that the location reporting mode is respective transmission in the message transmitted by the random access preamble and the uplink scheduling message, report the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, divide the location information into two parts, and report the parts of the location information via the message transmitted by a corresponding random access preamble and uplink scheduling message respectively, in the random access procedure adopted by the current beam.

In a possible implementation manner, the processor 1703 is further configured to:

determine a current value of the RACH configuration parameter corresponding to the location information based on a corresponding relationship between bits or values occupied by the location information and values of the RACH configuration parameter; and report the current value in the message transmitted by the corresponding random access preamble, in the random access procedure adopted by the current beam.

In a possible implementation manner, the RACH configuration parameter includes: at least one of a PRACH format, a RO resource, or a preamble index resource of the preamble.

In a possible implementation manner, the preamble index resource includes: a one-level preamble index and a multi-level preamble index; and, the multi-level preamble index includes multiple one-level preamble indexes; each level of preamble indexes corresponds to one preamble index range; and adjacent two levels of preamble indexes have same or different preamble index ranges, and take values independent of each other.

In a possible implementation manner, a total number of bits occupied by the location information is log 2(R); and, R is a size of a value range of the RACH configuration parameter, and log 2( ) indicates a logarithm with a base of 2.

In a possible implementation manner, in case that the location information is indicated by the multi-level preamble index: bits corresponding to the total number of bits or all values of the location information are divided into multiple sets in a preset order, the multiple sets are in one-to-one correspondence with the multi-level preamble index, and bits or values of the location information in each of the multiple sets are in one-to-one correspondence with preamble indexes in a corresponding level of preamble indexes.

In a possible implementation manner, the preset order includes: an order of the location information from a high bit to a low bit, or an order of the location information from a low bit to a high bit.

In a possible implementation manner, in case that the location information is jointly indicated by the RO resource and the preamble index resource, one RO carries the one-level preamble index.

In a possible implementation manner, the processor 1703 is further configured to: report the location information via at least one of data part of the PUSCH carrying the uplink scheduling message or a PUSCH demodulation reference signal (DMRS), or report the location information jointly via data part of the PUSCH carrying the uplink scheduling message and a PUSCH DMRS.

In a possible implementation manner, the processor 1703 is further configured to:

in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; and, the preset order includes an order of the location information from a high bit to a low bit, or an order of the location information from a low bit to a high bit.

The transceiver 1702 is configured to receive and send data under the control of the processor 1703.

Herein, in FIG. 17, the bus architecture may include any number of interconnected buses and bridges, specifically various circuits of one or more processors 1703 represented by the processor 1703 and the memory represented by the memory 1701 are linked together. The bus architecture can also link together various other circuits such as peripherals, voltage regulators, and power management circuits, etc., which are well known in the art and therefore will not be further described herein. The bus interface provides the interface. The transceiver 1702 may be multiple elements that include transmitters and receivers, providing units for communicating with various other devices over transmission media, and the transmission media include wireless channels, wired channels, fiber optic cables, etc. For different user devices, the user interface 1704 may also be an interface is configured to connect externally and internally to required devices, and the connected devices include but not limited to keypads, monitors, speakers, microphones, joysticks, and so on.

The processor 1703 is responsible for managing the bus architecture and general processing, and the memory 1701 can store data used by the processor 1703 when performing operations.

In one embodiment, the processor 1703 may be a central processing unit (CPU), an application specific integrated circuit (ASIC), a field-programmable gate array (FPGA) or a complex programmable logic device (CPLD); and the processor 1703 may also adopt a multi-core architecture.

The processor 1703 is configured to execute any method provided by the embodiments of the present disclosure according to the obtained executable instructions by calling the computer programs stored in the memory. The processor 1703 and the memory may also be arranged physically separately.

Figure 18:
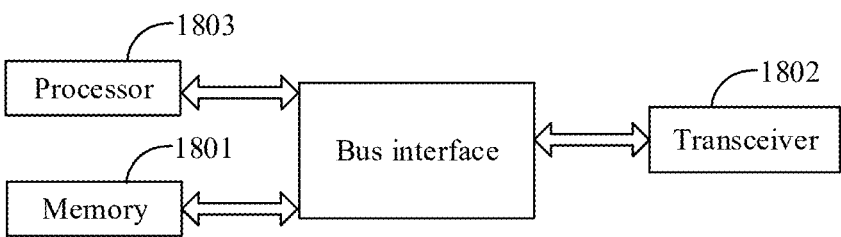
FIG. 18 is a schematic structural diagram of a satellite base station according to an embodiment of the present disclosure.

As shown in FIG. 18, a satellite base station according to an embodiment of the present disclosure includes a memory 1801, a transceiver 1802, and a processor 1803. The memory 1801 is configured to store computer programs; the transceiver 1802 is configured to send and receive data under the control of the processor 1803; and the processor 1803 is configured to read the computer programs in the memory 1801 and perform:

sending a system broadcast message, and a terrestrial terminal determines a beam type of a current beam and a random access procedure of the current beam based on the system broadcast message; and the beam type includes an access beam and a service beam;

notifying the terrestrial terminal of reporting the location reporting mode of a current location of the terrestrial terminal in case that the beam type of the current beam is the access beam; and, the terrestrial terminal adopts the random access method on the terrestrial terminal side to randomly access the satellite base station;

receiving the location information of the current location of the terrestrial terminal via the location reporting mode, in the random access procedure of the current beam; and scheduling a corresponding service beam for the terrestrial terminal based on the location information, and generating and sending corresponding service beam configuration information, to control the terrestrial terminal to complete the random access procedure in the service beam.

The transceiver 1802 is configured to receive and send data under the control of the processor 1803.

Herein, in FIG. 18, the bus architecture may include any number of interconnected buses and bridges, specifically various circuits of one or more processors represented by the processor 1803 and the memory represented by the memory 1801 are linked together. The bus architecture can also link together various other circuits such as peripherals, voltage regulators, and power management circuits, etc., which are well known in the art and therefore will not be further described herein. The bus interface provides the interface. The transceiver 1802 may be multiple elements that include transmitters and receivers, providing units for communicating with various other devices over transmission media, and the transmission media include wireless channels, wired channels, fiber optic cables, etc. The processor 1803 is responsible for managing the bus architecture and general processing, and the memory 1801 can store data used by the processor 1803 when performing operations.

The processor 1803 may be a CPU, an ASIC, a FPGA or a CPLD; and the processor 1703 may also adopt a multi-core architecture.

It should be noted herein that the above device provided by the embodiment of the present disclosure can realize all the method steps realized by the above method embodiments and can achieve the same effect, and the portion of the embodiment same as the method embodiments and the beneficial effect will not be elaborated in detail.

Figure 19:
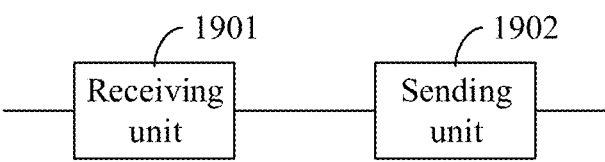
FIG. 19 is a schematic structural diagram of another terrestrial terminal according to an embodiment of the present disclosure.

One embodiment of the present disclosure provides a terrestrial terminal. The specific implementation of the random access method of the terrestrial terminal in the satellite communication system may refer to the description of the method embodiments on the terrestrial terminal side, and will not be repeated. Please refer to FIG. 19, the terrestrial terminal includes:

a receiving unit 1901, configured to obtain a beam type of a current beam and a random access procedure of the current beam from a received system broadcast message from a satellite base station; and the beam type includes an access beam and a service beam;

the receiving unit 1901 further configured to: obtain a location reporting mode of the terrestrial terminal in case that the beam type of the current beam is the access beam; and the location reporting mode is configured for indicating a location reporting way of the terrestrial terminal; and a sending unit 1902, configured to report location information by the location reporting mode in the random access procedure of the current beam; and the location information is configured for determining the service beam corresponding to the terrestrial terminal.

In a possible implementation manner, the receiving unit 1901 is further configured to:

obtain beam configuration information of the current beam; and, in case that the beam type of the current beam is the access beam, the beam configuration information includes sub-ranges included in a coverage of the current beam, one or more sub-ranges of the current beam corresponds to one service beam in the current beam, and different service beams correspond to different sub-ranges;

in case that the terrestrial terminal does not have a global navigation satellite system (GNSS) positioning function, determine positioning information of a current location of the terrestrial terminal by using other positioning methods except the GNSS positioning function; and take a service beam index of the service beam in the beam configuration information that corresponds to an index value of the sub-range corresponding to the positioning information, as the location information of the terrestrial terminal; and in case that the terrestrial terminal has a GNSS positioning function, obtain GNSS positioning information of a current location of the terrestrial terminal based on the GNSS positioning function; and take a service beam index in the beam configuration information that corresponds to the GNSS positioning information, as the location information of the terrestrial terminal.

In a possible implementation manner, the receiving unit 1901 is further configured to:

receive first information of the satellite base station;

in case that the first information includes a signaling directly indicating the location reporting mode, determine the location reporting mode based on the signaling; and in case that the first information is random access channel (RACH) configuration information of the current beam, determine the location reporting mode based on whether there is a RACH configuration parameter in the RACH configuration information associated with the location information.

In a possible implementation manner, the location reporting mode includes: location reporting via at least one of a message transmitted by a random access preamble, or an uplink scheduling message carried by a PUSCH.

In a possible implementation manner, in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure.

In a possible implementation manner, the signaling includes: a MIB or a SIB1.

In a possible implementation manner, the determining of the location reporting mode based on whether there is a RACH configuration parameter in the RACH configuration information associated with the location information, includes:

in case that there is a RACH configuration parameter in the RACH configuration information associated with the location information, reporting the location information in the message transmitted by the random access preamble corresponding to the current beam; and in case that there is no RACH configuration parameter in the RACH configuration information associated with the location information, reporting the location information in the uplink scheduling message corresponding to the current beam.

In a possible implementation manner, the sending unit 1902 is further configured to:

in case that the location reporting mode is transmission in the message transmitted by the random access preamble, report the location information via the message transmitted by a corresponding random access preamble, in the random access procedure adopted by the current beam;

in case that the location reporting mode is transmission in the uplink scheduling message, report the location information via a corresponding uplink scheduling message in the random access procedure adopted by the current beam;

in case that the location reporting mode is respective transmission in the message transmitted by the random access preamble and the uplink scheduling message, report the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, divide the location information into two parts, and report the parts of the location information via the message transmitted by a corresponding random access preamble and uplink scheduling message respectively, in the random access procedure adopted by the current beam.

In a possible implementation manner, the sending unit 1902 is further configured to:

determine a current value of the RACH configuration parameter corresponding to the location information based on a corresponding relationship between bits or values occupied by the location information and values of the RACH configuration parameter; and report the current value in the message transmitted by the corresponding random access preamble, in the random access procedure adopted by the current beam.

In a possible implementation manner, the RACH configuration parameter includes: at least one of a PRACH format, a RO resource, or a preamble index resource of the preamble.

In a possible implementation manner, the preamble index resource includes: a one-level preamble index and a multi-level preamble index; and, the multi-level preamble index includes multiple one-level preamble indexes; each level of preamble indexes corresponds to one preamble index range; and adjacent two levels of preamble indexes have same or different preamble index ranges, and take values independent of each other.

In a possible implementation manner, when a total number of bits occupied by the location information is $\log 2(R)$; and, R is a size of a value range of the RACH configuration parameter, and $\log 2(\ )$ indicates a logarithm with a base of 2.

In a possible implementation manner, in case that the location information is indicated by the multi-level preamble index: bits corresponding to the total number of bits or all values of the location information are divided into multiple sets in a preset order, the multiple sets are in one-to-one correspondence with the multi-level preamble index, and bits or values of the location information in each of the multiple sets are in one-to-one correspondence with preamble indexes in a corresponding level of preamble indexes.

In a possible implementation manner, the preset order includes: an order of the location information from a high bit to a low bit, or an order of the location information from a low bit to a high bit.

In a possible implementation manner, in case that the location information is jointly indicated by the RO resource and the preamble index resource, one RO carries the one-level preamble index.

In a possible implementation manner, the sending unit 1902 is further configured to: report the location information via at least one of data part of the PUSCH carrying the uplink scheduling message or a PUSCH DMRS, or report the location information jointly via data part of the PUSCH carrying the uplink scheduling message and a PUSCH DMRS.

In a possible implementation manner, in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; and, the preset order includes an order of the location information from a high bit to a low bit, or an order of the location information from a low bit to a high bit.

Figure 20:
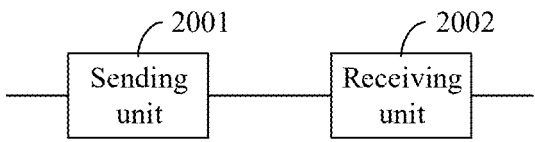
FIG. 20 is a schematic structural diagram of another satellite base station according to an embodiment of the present disclosure.

One embodiment of the present disclosure provides a satellite base station. The specific implementation of the random access method of the satellite base station may refer to the description of the method embodiments on the satellite base station side. Please refer to FIG. 20, the satellite base station includes:

a sending unit 2001, configured to send a system broadcast message, and a terrestrial terminal determines a beam type of a current beam and a random access procedure of the current beam based on the system broadcast message; and the beam type includes an access beam and a service beam;

the sending unit 2001 further configured to: notify the terrestrial terminal of reporting the location reporting mode of a current location of the terrestrial terminal in case that the beam type of the current beam is the access beam; and, the terrestrial terminal adopts the random access method on the terrestrial terminal side to randomly access the satellite base station; and a receiving unit 2002, configured to receive the location information of the current location of the terrestrial terminal via the location reporting mode, in the random access procedure of the current beam; and the sending unit 2001 further configured to: schedule a corresponding service beam for the terrestrial terminal based on the location information, and generate and send corresponding service beam configuration information, to control the terrestrial terminal to complete the random access procedure in the service beam.

It should be noted that the division of the units in the embodiments of the present disclosure is schematic, and is only a logical function division; and there may be another division manner in actual implementation. In addition, each functional unit in each embodiment of the present disclosure may be integrated into one processing unit, and each unit may exist separately physically, or two or more units may be integrated into one unit. The above integrated units can be implemented in the form of hardware or in the form of software functional units.

If the integrated unit is implemented in the form of a software functional unit and sold or used as an independent product, the integrated unit can be stored in a processor-readable storage medium. Based on this understanding, the embodiments in the disclosure, in essence or as a contribution to the prior art, or all or part of the embodiments can be embodied in the form of a software product. The computer software product is stored in a storage medium, including several instructions to enable a computer device (which can be a personal computer, a server, or a network device, etc.) or processor to perform all or part of the steps of the methods of various embodiments of the present disclosure. The aforementioned storage media include: a USB flash disk, a mobile hard disk, a read-only memory (ROM), a random access memory (RAM), a magnetic disk, an optical disc, and other media that can store program codes.

It should be noted herein that the above device according to the embodiment of the present disclosure can realize all the method steps realized by the above method embodiments and can achieve the same effect, and the portion of the embodiment same as the method embodiments and the beneficial effect will not be elaborated in detail.

One embodiment of the present disclosure further provides a processor-readable storage medium, storing computer programs, and the computer programs are configured to enable the processor to perform the above random access method on the terrestrial terminal side or the satellite base station side.

The processor-readable storage medium can be any available medium or data storage device that can be accessed by the processor, including but not limited to a magnetic storage (e.g., a floppy disk, a hard disk, a tape, a magneto-optical disc (MO), etc.), an optical storage (e.g., CD, DVD, BD, HVD, etc.), and a semiconductor memory (e.g., ROM, EPROM, EEPROM, non-volatile memory (NAND FLASH), a solid state disk (SSD)), etc.

The embodiments of the present disclosure may be provided as methods, systems, or computer program products.

Accordingly, the present disclosure may take the form of an entire hardware embodiment, an entire software embodiment, or an embodiment combining software and hardware aspects. Furthermore, the present disclosure may take the form of a computer program product embodied on one or more computer-usable storage media (including but not limited to a disk storage, an optical storage, etc.) having computer-usable program codes embodied therein.

The present disclosure is described with reference to flow diagrams and/or block diagrams of the methods, the devices (systems), and computer program products according to the embodiments of the present application. It should be understood that each flow and/or block in the flow diagrams and/or the block diagrams and combinations of the flows and/or the blocks in the flow diagrams and/or the block diagrams can be implemented by computer-executable instructions. These computer-executable instructions may be provided to a processor of a general-purpose computer, a special-purpose computer, an embedded processing machine or other programmable data processing devices to generate a machine, and the instructions, when executed by the processor of the computer or other programmable data processing devices, generate an apparatus for implementing functions specified in one or more flows in the flow diagrams and/or one or more blocks in the block diagrams.

These processor-executable instructions may also be stored in a processor-readable memory which can guide the computer or other programmable data processing devices to work in a specific mode, thus the instructions stored in the processor-readable memory generate an article of manufacture that includes a commander apparatus that implements the functions specified in one or more flows in the flow diagrams and/or one or more blocks in the block diagrams.

These processor-executable instructions can also be loaded onto a computer or other programmable data processing devices, and a series of operating steps are executed on the computer or other programmable devices to generate computer-implemented processing, and the instructions executed on the computer or other programmable devices provide steps for implementing the functions specified in one or more flows in the flow diagrams and/or one or more blocks in the block diagrams.

Various modifications and variations to the present disclosure without departing from the spirit and scope of the present disclosure. Thus, if these modifications and variations of the present disclosure fall within the scope of the claims of the present disclosure and equivalent technologies thereof, the present disclosure also intends to include these modifications and variations.

What is claimed is:

1. A random access method, performed by a terrestrial terminal in a satellite communication system, wherein the method comprises:

obtaining a beam type of a current beam and a random access procedure of the current beam from a received system broadcast message from a satellite base station; wherein the beam type comprises an access beam and a service beam;

obtaining a location reporting mode of the terrestrial terminal in case that the beam type of the current beam is the access beam; wherein the location reporting mode is configured for indicating a location reporting way of the terrestrial terminal; and reporting location information by the location reporting mode in the random access procedure of the current beam; wherein the location information is configured for determining the service beam corresponding to the terrestrial terminal.

2. The method according to claim 1, further comprising:

obtaining beam configuration information of the current beam; wherein, in case that the beam type of the current beam is the access beam, the beam configuration information comprises sub-ranges comprised in a coverage of the current beam, one or more sub-ranges of the current beam corresponds to one service beam in the current beam, and different service beams correspond to different sub-ranges;

in case that the terrestrial terminal does not have a global navigation satellite system (GNSS) positioning function, determining positioning information of a current location of the terrestrial terminal by using other positioning methods except the GNSS positioning function; and taking a service beam index of the service beam in the beam configuration information that corresponds to an index value of the sub-range corresponding to the positioning information, as the location information of the terrestrial terminal; and in case that the terrestrial terminal has the GNSS positioning function, obtaining GNSS positioning information of the current location of the terrestrial terminal based on the GNSS positioning function; and taking a service beam index in the beam configuration information that corresponds to the GNSS positioning information, as the location information of the terrestrial terminal.

3. The method according to claim 2, wherein the obtaining of the location reporting mode of the terrestrial terminal comprises:

receiving first information of the satellite base station;

in case that the first information comprises a signaling directly indicating the location reporting mode, determining the location reporting mode based on the signaling; and in case that the first information is random access channel (RACH) configuration information of the current beam, determining the location reporting mode based on whether a RACH configuration parameter associated with the location information exists in the RACH configuration information;

wherein the location reporting mode comprises:

location reporting via at least one of a message transmitted by a random access preamble, or an uplink scheduling message carried by a physical uplink shared channel (PUSCH).

4. The method according to claim 3, wherein, in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure;

wherein the signaling comprises:

a master information block (MIB) or a system information block 1 (SIB1).

5. The method according to claim 3, wherein, the determining of the location reporting mode based on whether the RACH configuration parameter associated with the location information exists in the RACH configuration information, comprises:

in case that there is the RACH configuration parameter in the RACH configuration information associated with the location information, reporting the location information in the message transmitted by the random access preamble corresponding to the current beam; and in case that there is no RACH configuration parameter in the RACH configuration information associated with the location information, reporting the location information in the uplink scheduling message corresponding to the current beam.

6. The method according to claim 3, wherein the reporting of the location information by the location reporting mode comprises:

in case that the location reporting mode is transmission in the message transmitted by the random access preamble, reporting the location information via the message transmitted by a corresponding random access preamble, in the random access procedure adopted by the current beam;

in case that the location reporting mode is transmission in the uplink scheduling message, reporting the location information via a corresponding uplink scheduling message, in the random access procedure adopted by the current beam;

in case that the location reporting mode is respective transmission in the message transmitted by the random access preamble and the uplink scheduling message, reporting the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, dividing the location information into two parts, and reporting the parts of the location information via the message transmitted by a corresponding random access preamble and uplink scheduling message respectively, in the random access procedure adopted by the current beam.

7. The method according to claim 6, wherein the reporting of the location information via the message transmitted by the corresponding random access preamble comprises:

determining a current value of the RACH configuration parameter corresponding to the location information based on a corresponding relationship between bits or values occupied by the location information and values of the RACH configuration parameter; and reporting the current value in the message transmitted by the corresponding random access preamble, in the random access procedure adopted by the current beam;

wherein the RACH configuration parameter comprises at least one of:

a PRACH format, a RACH occasion (RO) resource, or a preamble index resource of the preamble;

wherein the preamble index resource comprises:

a one-level preamble index and a multi-level preamble index; wherein, the multi-level preamble index comprises multiple one-level preamble indexes; each level of preamble indexes corresponds to one preamble index range; and adjacent two levels of preamble indexes have same or different preamble index ranges, and take values independent of each other;

wherein a total number of bits occupied by the location information is log 2 (R);

wherein, R is a size of a value range of the RACH configuration parameter, and log 2 ( ) indicates a logarithm with a base of 2;

wherein in case that the location information is indicated by the multi-level preamble index:

bits corresponding to the total number of bits or all values of the location information are divided into multiple sets according to a preset order, the multiple sets are in one-to-one correspondence with the multi-level preamble index, and bits or values of the location information in each of the multiple sets are in one-to-one correspondence with preamble indexes in a corresponding level of preamble indexes;

wherein the preset order comprises:

an order of the location information from a high bit to a low bit, or an order of the location information from a low bit to a high bit.

8. The method according to claim 7, wherein in case that the location information is jointly indicated by the RO resource and the preamble index resource, one RO carries the one-level preamble index.

9. The method according to claim 6, wherein the reporting of the location information via the corresponding uplink scheduling message comprises:

reporting the location information via at least one of data part of the PUSCH carrying the uplink scheduling message or a PUSCH demodulation reference signal (DMRS), or reporting the location information jointly via data part of the PUSCH carrying the uplink scheduling message and a PUSCH DMRS;

wherein in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; wherein, the preset order comprises an order of the location information from a high bit to a low bit, or an order of the location information from a low bit to a high bit.

10. A random access method, performed by a satellite base station in a satellite communication system, wherein the method comprises:

sending a system broadcast message, to enable a terrestrial terminal to determine a beam type of a current beam and a random access procedure of the current beam based on the system broadcast message; wherein the beam type comprises an access beam and a service beam;

notifying the terrestrial terminal of reporting a location reporting mode of a current location of the terrestrial terminal in case that the beam type of the current beam is the access beam; wherein, the terrestrial terminal adopts the method in claim 1 to randomly access the satellite base station;

receiving location information of the current location of the terrestrial terminal via the location reporting mode, in the random access procedure of the current beam; and scheduling a corresponding service beam for the terrestrial terminal based on the location information, and generating and sending corresponding service beam configuration information, to control the terrestrial terminal to complete the random access procedure in the service beam.

11. A terrestrial terminal, comprising a memory, a transceiver, and a processor:

wherein the memory is configured to store computer programs; the transceiver is configured to send and receive data under the control of the processor; and the processor is configured to read the computer programs in the memory and perform:

obtaining a beam type of a current beam and a random access procedure of the current beam from a received system broadcast message from a satellite base station; wherein the beam type comprises an access beam and a service beam;

obtaining a location reporting mode of the terrestrial terminal in case that the beam type of the current beam is the access beam; wherein the location reporting mode is configured for indicating a location reporting way of the terrestrial terminal; and reporting location information by the location reporting mode in the random access procedure of the current beam; wherein the location information is configured for determining the service beam corresponding to the terrestrial terminal.

12. The terrestrial terminal according to claim 11, wherein the processor is further configured to:

obtain beam configuration information of the current beam; wherein, in case that the beam type of the current beam is the access beam, the beam configuration information comprises sub-ranges comprised in a coverage of the current beam, one or more sub-ranges of the current beam corresponds to one service beam in the current beam, and different service beams correspond to different sub-ranges;

in case that the terrestrial terminal does not have a global navigation satellite system (GNSS) positioning function, determine positioning information of a current location of the terrestrial terminal by using other positioning methods except the GNSS positioning function; and take a service beam index of the service beam in the beam configuration information that corresponds to an index value of the sub-range corresponding to the positioning information, as the location information of the terrestrial terminal; and in case that the terrestrial terminal has the GNSS positioning function, obtain GNSS positioning information of the current location of the terrestrial terminal based on the GNSS positioning function; and take a service beam index in the beam configuration information that corresponds to the GNSS positioning information, as the location information of the terrestrial terminal;

wherein the processor is further configured to:

receive first information of the satellite base station;

in case that the first information comprises a signaling directly indicating the location reporting mode, determine the location reporting mode based on the signaling; and in case that the first information is random access channel (RACH) configuration information of the current beam, determine the location reporting mode based on whether a RACH configuration parameter associated with the location information exists in the RACH configuration information.

13. The terrestrial terminal according to claim 12, wherein the location reporting mode comprises:

location reporting via at least one of a message transmitted by a random access preamble, or an uplink scheduling message carried by a physical uplink shared channel (PUSCH).

14. The terrestrial terminal according to claim 13, wherein:

in case that the random access procedure adopted by the current beam is a four-step random access procedure, the message transmitted by the random access preamble is a message 1 of the four-step random access procedure, and the uplink scheduling message is a message 3 of the four-step random access procedure; and in case that the random access procedure adopted by the current beam is a two-step random access procedure, a message carrying the random access preamble is a message A-physical random access channel (PRACH) of the two-step random access procedure, and a message carrying the uplink scheduling message is a message A-PUSCH of the two-step random access procedure;

wherein the signaling comprises:

a master information block (MIB) or a system information block 1 (SIB1).

15. The terrestrial terminal according to claim 13, wherein the processor is further configured to:

in case that there is the RACH configuration parameter in the RACH configuration information associated with the location information, report the location information in the message transmitted by the random access preamble corresponding to the current beam; and in case that there is no RACH configuration parameter in the RACH configuration information associated with the location information, report the location information in the uplink scheduling message corresponding to the current beam.

16. The terrestrial terminal according to claim 13, wherein the processor is further configured to:

in case that the location reporting mode is transmission in the message transmitted by the random access preamble, report the location information via the message transmitted by a corresponding random access preamble, in the random access procedure adopted by the current beam;

in case that the location reporting mode is transmission in the uplink scheduling message, report the location information via a corresponding uplink scheduling message, in the random access procedure adopted by the current beam;

in case that the location reporting mode is respective transmission in the message transmitted by the random access preamble and the uplink scheduling message, report the location information via the message transmitted by a corresponding random access preamble and uplink scheduling message respectively, in the random access procedure adopted by the current beam; and in case that the location reporting mode is joint transmission in the message transmitted by the random access preamble and the uplink scheduling message, divide the location information into two parts, and report the parts of the location information via the message transmitted by a corresponding random access preamble and uplink scheduling message respectively, in the random access procedure adopted by the current beam.

17. The terrestrial terminal according to claim 16, wherein the processor is further configured to:

determine a current value of the RACH configuration parameter corresponding to the location information based on a corresponding relationship between bits or values occupied by the location information and values of the RACH configuration parameter; and report the current value in the message transmitted by the corresponding random access preamble, in the random access procedure adopted by the current beam;

wherein the RACH configuration parameter comprises at least one of:

a PRACH format, a RACH occasion (RO) resource, or a preamble index resource of the preamble;

wherein the preamble index resource comprises:

a one-level preamble index and a multi-level preamble index; wherein, the multi-level preamble index comprises multiple one-level preamble indexes; each level of preamble indexes corresponds to one preamble index range; and adjacent two levels of preamble indexes have same or different preamble index ranges, and take values independent of each other;

wherein a total number of bits occupied by the location information is $\log 2 (R)$; wherein, R is a size of a value range of the RACH configuration parameter, and $\log 2$ ( ) indicates a logarithm with a base of 2;

wherein in case that the location information is indicated by the multi-level preamble index: bits corresponding to the total number of bits or all values of the location information are divided into multiple sets according to a preset order, the multiple sets are in one-to-one correspondence with the multi-level preamble index, and bits or values of the location information in each of the multiple sets are in one-to-one correspondence with preamble indexes in a corresponding level of preamble indexes;

wherein the preset order comprises:

an order of the location information from a high bit to a low bit, or an order of the location information from a low bit to a high bit.

18. The terrestrial terminal according to claim 17, wherein in case that the location information is jointly indicated by the RO resource and the preamble index resource, one RO carries the one-level preamble index.

19. The terrestrial terminal according to claim 16, wherein the processor is further configured to:

report the location information via at least one of data part of the PUSCH carrying the uplink scheduling message or a PUSCH demodulation reference signal (DMRS), or report the location information jointly via data part of the PUSCH carrying the uplink scheduling message and a PUSCH DMRS; wherein in a case of reporting the location information via the PUSCH DMRS, scrambling sequences of the PUSCH DMRS are in one-to-one correspondence with all bits occupied by the location information; or in a case of jointly reporting the location information via the PUSCH DMRS and the data part, all bits occupied by the location information are divided into two parts according to a preset order, the PUSCH DMRS and the data part respectively correspond to one of the two parts, and scrambling sequences of the PUSCH DMRS are in one-to-one correspondence with bits occupied by a corresponding part; wherein, the preset order comprises an order of the location information from a high bit to a low bit, or an order of the location information from a low bit to a high bit.

20. A satellite base station, comprising a memory, a transceiver, and a processor:

wherein the memory is configured to store computer programs; the transceiver is configured to send and receive data under the control of the processor; and the processor is configured to read the computer programs in the memory and perform:

sending a system broadcast message, to enable a terrestrial terminal to determine a beam type of a current beam and a random access procedure of the current beam based on the system broadcast message; wherein the beam type comprises an access beam and a service beam;

notifying the terrestrial terminal of reporting a location reporting mode of a current location of the terrestrial terminal in case that the beam type of the current beam is the access beam; wherein, the terrestrial terminal adopts the method claim 1 to access the satellite base station;

receiving location information of the current location of the terrestrial terminal via the location reporting mode, in the random access procedure of the current beam; and scheduling a corresponding service beam for the terrestrial terminal based on the location information, and generating and sending corresponding service beam configuration information, to control the terrestrial terminal to complete the random access procedure in the service beam.

* * * * *